(12) United States Patent
Nakagawa et al.

(10) Patent No.: US 7,129,294 B2
(45) Date of Patent: Oct. 31, 2006

(54) FUNCTIONAL GROUPS-TERMINATED VINYL POLYMERS

(75) Inventors: Yoshiki Nakagawa, Kobe (JP); Kenichi Kitano, Kobe (JP); Masato Kusakabe, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/870,397

(22) Filed: May 31, 2001

(65) Prior Publication Data

US 2002/0137841 A1 Sep. 26, 2002

Related U.S. Application Data

(62) Division of application No. 09/122,896, filed on Jul. 28, 1998, now Pat. No. 6,274,688.

(30) Foreign Application Priority Data

| Jul. 28, 1997 | (JP) | ................... 9-218089 |
| Jul. 28, 1997 | (JP) | ................... 9-218090 |
| Jul. 28, 1997 | (JP) | ................... 9-218091 |

(51) Int. Cl.
*C08L 83/04* (2006.01)

(52) U.S. Cl. .................... 525/100; 525/105; 525/106; 528/31

(58) Field of Classification Search ................ 526/279; 525/100, 105, 106; 528/31
See application file for complete search history.

(56) References Cited

U.S. PATENT DOCUMENTS

| 3,786,116 | A | | 1/1974 | Milkovich et al. .......... 260/885 |
| 4,732,808 | A | | 3/1988 | Krampe et al. ............. 428/355 |
| 5,321,093 | A | * | 6/1994 | Bronstert et al. ........... 525/250 |
| 5,376,743 | A | * | 12/1994 | Baker et al. ................ 526/129 |
| 5,376,745 | A | | 12/1994 | Handlin, Jr. et al. ........ 526/178 |
| 5,405,731 | A | | 4/1995 | Chandrasekaran et al. .. 430/260 |
| 5,753,768 | A | | 5/1998 | Ellis .......................... 525/309 |
| 5,763,548 | A | * | 6/1998 | Matyjaszewski et al. ... 526/135 |
| 5,773,534 | A | * | 6/1998 | Antonelli et al. ............. 526/82 |
| 5,777,037 | A | | 7/1998 | Yamanaka et al. |
| 5,789,487 | A | | 8/1998 | Matyjaszewski et al. ... 525/301 |
| 5,807,937 | A | | 9/1998 | Matyjaszewski et al. ... 526/135 |
| 5,986,014 | A | * | 11/1999 | Kusakabe et al. .......... 525/342 |
| 6,482,900 | B1 | | 11/2002 | Nakagawa et al. |
| 6,667,369 | B1 | * | 12/2003 | Kusakabe et al. .......... 525/342 |

FOREIGN PATENT DOCUMENTS

| JP | 3-504026 A | 9/1991 |
| JP | 4-501883 A | 4/1992 |
| JP | 6-329722 A | 11/1994 |
| JP | 8-253531 A | 10/1996 |
| JP | 9-272715 A | 10/1997 |
| JP | 10-287702 | 10/1998 |
| JP | 11-80249 A | 3/1999 |
| JP | 11-80250 A | 3/1999 |
| WO | WO-90/09403 | 8/1990 |
| WO | WO 96/30421 | 10/1996 |
| WO | WO 97/18247 | 5/1997 |

* cited by examiner

*Primary Examiner*—Margaret G. Moore
(74) *Attorney, Agent, or Firm*—Connolly Bove Lodge & Hutz; Burton A. Amernick

(57) ABSTRACT

A vinyl polymer which has at least one terminal functional group per molecule and has a ratio of weight average molecular weight to number average molecular weight of less than 1.8 as determined by gel permeation chromatography, said terminal functional group being a crosslinking silyl group, an alkenyl group, or a hydroxyl group.

10 Claims, No Drawings

FUNCTIONAL GROUPS-TERMINATED VINYL POLYMERS

CROSS REFERENCE TO RELATED APPLICATIONS

This application is a divisional application of our application U.S. Ser. No. 09/122,896 filed Jul. 28, 1998 now U.S. Pat. No. 6,274,688 and entitled Functional Groups-Terminated Vinyl Polymers, which in turn claimed priority under 35 USC 119 from Japanese applications Hei-9-218089, Hei-9-218090, and Hei-9-218091, all filed on Jul. 28, 1997.

FIELD OF THE INVENTION

The present invention relates to a crosslinking silyl-, alkenyl- or hydroxy-terminated vinyl polymer. More particularly, it relates to a vinyl polymer which has a narrow molecular weight distribution, hence is easy to handle.

PRIOR ART

Intramolecular crosslinking silyl group-containing vinyl polymers, in particular (meth)acrylic polymers, are used in weather-resistant paints utilizing the high weather resistance based on their main chain and crosslinking points. These (meth)acrylic polymers are generally produced by copolymerizing a crosslinking silyl-containing (meth)acrylic monomer with one or more other monomers and therefore have crosslinking silyl groups at random positions in the molecular chain, hence they are difficult to use as rubber-like materials. On the other hand, attempts have been made to produce (meth)acrylic polymers having crosslinking silyl groups at molecular ends for use as sealants or adhesives. For producing (meth)acrylic polymers having terminal crosslinking silyl groups, Japanese Kokoku Publication Hei-03-14068, for instance, discloses a method comprising polymerizing a (meth)acrylic monomer in the presence of a crosslinking silyl-containing mercaptan, a crosslinking silyl-containing disulfide and a crosslinking silyl-containing radical polymerization initiator; Japanese Kokoku Publication Hei-04-55444 discloses a method comprising polymerizing a acrylic monomer in the presence of a crosslinking silyl-containing hydrosilane compound or a tetrahalosilane; and Japanese Kokai Publication Hei-06-211922 describes a method for producing crosslinking silyl-terminated (meth) acrylic polymers which comprises first synthesizing a hydroxy-terminated acrylic polymer by using a hydroxyl-containing polysulfide in a larger amount as compared with the initiator and then converting the hydroxyl groups.

Meanwhile, it is known that alkenyl-terminated polymers, when crosslinked by themselves or using a curing agent such as a hydrosilyl-containing compound, give cured products excellent in heat resistance and durability. The main chain skeletons of such polymers include polyether polymers such as polyethylene oxide, polypropylene oxide and polytetramethylene oxide; hydrocarbon polymers such as polybutadiene, polyisoprene, polychloroprene, polyisobutylene and hydrogenation products derived from these; polyester polymers such as polyethylene terephthalate, polybutylene terephthalate and polycaprolactone; and polysiloxane polymers such as polydimethylsiloxane, among others. They are used in various applications according to the characteristics of the respective main chain skeletons.

As compared with those polymers mentioned above which are obtained by ionic polymerization or condensation polymerization, alkenyl-terminated vinyl polymers obtainable by radical polymerization have scarcely been put to practical use. Among vinyl polymers, meth(acrylic) polymers have high weather resistance, transparency and other characteristics which the above-mentioned polyether polymers or polyester polymers cannot have. For example, vinyl polymers having alkenyl groups in side chains are used in paint compositions for obtaining high weather resistance.

If alkenyl-terminated vinyl polymers could be obtained in a simple manner, cured products superior in physical characteristics to cured products from vinyl polymers having alkenyl groups in side chains could be obtained. Therefore, a large number of researchers have made investigations in an attempt to establish a method of producing the same. It is not easy, however, to produce them on a commercial scale.

Japanese Kokai Publication Hei-01-247403 discloses a method for synthesizing vinyl polymers having alkenyl groups on both ends which uses an alkenyl-containing disulfide as a chain transfer agent, and Japanese Kokai Publication Hei-06-211922 discloses a method for synthesizing vinyl polymers having alkenyl groups on both ends which comprises synthesizing a vinyl polymer having hydroxyl groups on both ends using a hydroxyl-containing disulfide and then utilizing the reactivity of the hydroxyl groups. By these methods, however, it is difficult to introduce alkenyl groups at both ends without fail and it is impossible to obtain cured products having satisfactory characteristics. For introducing alkenyl groups at both ends with certainty, it is necessary to use the chain transfer agent in large amounts, and this offers a problem from the production process viewpoint. Since, in these methods, ordinary radical polymerization techniques are used, it is difficult to control the molecular weight and molecular weight distribution (ratio of weight average molecular weight to number average molecular weight).

It is also known that hydroxyl-terminated polymers, when crosslinked using a compound having functional groups capable of reacting with a hydroxyl group, for example an isocyanate compound, as a curing agent, give cured products excellent in heat resistance and durability, among others.

As the main chain skeletons of such hydroxyl-terminated polymers, there may be mentioned, as in the case of alkenyl-terminated polymers, polyether polymers such as polyethylene oxide, polypropylene oxide and polytetramethylene oxide; hydrocarbon polymers such as polybutadiene, polyisoprene, polychloroprene and polyisobutylene and hydrogenation products derived from these; and polyester polymers such as polyethylene terephthalate, polybutylene terephthalate and polycaprolactone, among others. Said polymers are used in various applications according to the main chain skeleton and mode of crosslinking thereof.

Vinyl polymers, in particular (meth)acrylic polymers, have such characteristics that the above-mentioned polyether polymers, hydrocarbon polymers or polyester polymers cannot have, for example high weather resistance and transparency, and those having hydroxyl groups in side chains are utilized in weather-resistant paint compositions, for instance.

If hydroxyl-terminated vinyl polymers could be obtained in a simple manner, cured products superior in physical characteristics to cured products from vinyl polymers having hydroxyl groups in side chains could be obtained. Therefore, a large number of researchers have made investigations in an attempt to establish a method of producing the same. It is not easy, however, to produce them on a commercial scale.

Japanese Kokai Publication Hei-05-262808 discloses a method for synthesizing (meth)acrylic polymers having hydroxyl groups at both ends which comprises using a hydroxyl-containing disulfide as a chain transfer agent. For introducing hydroxyl groups at both ends with certainty, it is necessary to use the chain transfer agent in large amounts as compared with the initiator, and this offers a problem from the production process viewpoint. Japanese Kokoku Publication Hei-01-19402 discloses a method for producing (meth)acrylic polymers having hydroxyl groups at both ends which comprises using hydrogen peroxide as an initiator. It is difficult, however, to introduce, by this method, hydroxyl groups at both ends with certainty. In fact, the method actually employed there comprises copolymerizing a hydroxyl-containing vinyl monomer (e.g. 2-hydroxyethyl methacrylate). Further, Japanese Kokai Publication Hei-04-132706 discloses a method for hydroxyl-terminated vinyl polymers which comprises producing a halogen-terminated (meth)acrylic polymer by polymerizing a (meth)acrylic monomer or monomers using a telogen such as methylene dibromide and reacting the terminal halogen atoms with a nucleophilic agent such as a diol compound, a hydroxyl-containing carboxylic acid, a hydroxyl-containing amine or the like for substitution. By this method, however, it is still difficult to achieve high-rate hydroxyl group introduction at both ends, since the chain transfer of the telogen is not sufficient.

In addition, since the methods mentioned above all use ordinary radical polymerization techniques, the polymers obtained have a broad molecular weight distribution (ratio of weight average molecular weight to number average molecular weight) (generally not less than 2) and therefore produce a high viscosity problem. The problem is that when the polymers are used in sealant or adhesive compositions, a high viscosity makes it difficult to handle the compositions on the occasion of application or makes it impossible to incorporate a large amount of fillers for reinforcement.

Accordingly, it is a primary object of the present invention to solve the above problems and provide vinyl polymers which have a narrow molecular weight distribution and therefore are easy to handle.

Recently, intensive studies have been made on living radical polymerization (see, for example, Matyjaszewski et al., J. Am. Chem. Soc., 1995, 117, 5614, Macromolecules, 1995, 28, 7901, Science, 1996, 272, 866; International Publication Patent WO96/30421 and WO97/18247; Sawamoto et al., Macromolecules, 1995, 28, 1721) and it is now possible to obtain halogen-terminated vinyl polymers showing a narrow molecular weight distribution by utilizing this polymerization technique. The present inventors found that crosslinking silyl-, alkenyl- or hydroxyl-terminated vinyl polymers showing a narrow molecular weight distribution can be obtained by using this new living radical polymerization technique. Based on such findings, the present inventors have now completed the present invention.

SUMMARY OF THE INVENTION

The present invention consists in a vinyl polymer which has at least one terminal functional group per molecule and has a ratio of weight average molecular weight to number average molecular weight of less than 1.8 as determined by gel permeation chromatography, said terminal functional group being a crosslinking silyl group of the general formula (1) shown below, an alkenyl group of the general formula (2) shown below or a hydroxyl group:

$$-[Si(R^1)_{2-b}(Y)_bO]_m-Si(R^2)_{3-a}(Y)_a \qquad (1)$$

wherein $R^1$ and $R^2$ each independently represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO-$ ($R'$ being a monovalent hydrocarbon residue containing 1 to 20 carbon atoms and the three $R'$ groups being the same or different), provided that when a plurality of $R^1$ or $R^2$ groups occur, they may be the same or different; Y represents a hydroxyl group or a hydrolyzable group, provided that when a plurality of Y groups occur, they may be the same or different; a represents 0, 1, 2 or 3, b represents 0, 1 or 2, and m represents an integer of 0 to 19, provided that the condition $a+mb \geq 1$ should be satisfied;

$$H_2C=C(R^3)- \qquad (2)$$

wherein $R^3$ represents a hydrogen atom or a methyl group.

BRIEF DESCRIPTION OF THE INVENTION

The present invention consists in a vinyl polymer which has at least one terminal functional group per molecule and has a ratio of weight average molecular weight to number average molecular weight of less 1.8 as determined by gel permeation chromatography, said terminal functional group being a crosslinking silyl group of the general formula (1) shown below, an alkenyl group of the general formula (2) shown below or a hydroxyl group:

$$-[Si(R^1)_{2-b}(Y)_bO]_m-Si(R^2)_{3-a}(Y)_a \qquad (1)$$

wherein $R^1$ and $R^2$ each independently represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO-$ ($R'$ being a monovalent hydrocarbon residue containing 1 to 20 carbon atoms and the three $R'$ groups being the same or different), provided that when a plurality of $R^1$ or $R^2$ groups occur, they may be the same or different; Y represents a hydroxyl group or a hydrolyzable group, provided that when a plurality of Y groups occur, they may be the same or different; a represents 0, 1, 2 or 3, b represents 0, 1 or 2, and m represents an integer of 0 to 19, provided that the condition $a+mb \geq 1$ should be satisfied;

$$H_2C=C(R^3)- \qquad (2)$$

wherein $R^3$ represents a hydrogen atom or a methyl group.

The number of the crosslinking silyl groups of general formula (1), the alkenyl groups of general formula (2) or the hydroxyl groups is at least one, preferably 1.2 to 4, per molecule. If said number is smaller than 1, the curable compositions containing said vinyl polymer may have poor curability.

The vinyl polymer of the present invention is characterized in that the molecular weight distribution thereof, namely the ratio of weight average molecular weight (Mw) to number average molecular weight (Mn), Mw/Mn, as determined by gel permeation chromatography (GPC) is narrow. The molecular weight distribution value is less than 1.8, preferably not more than 1.7, more preferably not more than 1.6, most preferably not more than 1.5, in particular not more than 1.4, and most desirably not more than 1.3. In the practice of the present invention, the GPC measurement is not limited to any particular technique but, generally, it is performed on a polystyrene gel column using chloroform as a mobile phase. The number average molecular weight, for instance, can be determined as a polystyrene equivalent.

The number average molecular weight of the vinyl polymer of the present invention is not critical but is preferably within the range of 500 to 100,000, more preferably within the range of 3,000 to 50,000. When said molecular weight is less than 500, the characteristics intrinsic to a vinyl polymer cannot be expressed whereas a molecular weight exceeding 100,000 makes handling difficult.

The vinyl monomer usable in the production of the main chain of the vinyl polymer of the present invention is not limited to any particular species but includes various monomers, for example (meth)acrylic acid monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth) acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, (meth)acrylic acid-ethylene oxide adducts, trifluoromethylmethyl (meth) acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylethyl (meth)acrylate, 2-perfluorohexylethyl (meth)acrylate, 2-perfluorodecylethyl (meth)acrylate and 2-perfluorohexadecylethyl (meth)acrylate; styrenic monomers such as styrene, vinyltoluene, α-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid, maleic acid monoalkyl esters and dialkyl esters; fumaric acid, fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile-containing vinyl monomers such as acrylonitrile and methacrylonitrile; amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol, etc. These may be used alone or a plurality thereof may be copolymerized. From the viewpoint of physical properties of products, styrenic monomers and (meth)acrylic monomers are preferred. More preferred are acrylic acid ester monomers and methacrylic acid ester monomers, and particularly preferred is butyl acrylate. In the practice of the present invention, these preferred monomers may be copolymerized with another or other monomers and, on that occasion, said preferred monomers preferably account for at least 40% by weight. The term "(meth)acrylic acid" or the like as used herein means acrylic acid and/or methacrylic acid.

The hydrolyzable group represented by Y in formula (1) in the crosslinking silyl-terminated polymer is not limited to any particular species but includes those already known in the art, for example hydrogen, halogen, alkoxy, acyloxy, ketoxymato, amino, amido, aminoxy, mercapto and alkenyloxy. Alkoxy groups are particularly preferred since they have mild hydrolyzability and therefore are easy to handle. Each silicon atom may have one to three such hydrolyzable groups or hydroxyl groups and the sum a+mb, namely the sum total of hydrolyzable groups is preferably within the range of 1 to 5. When the crosslinking silyl group contains two or more hydrolyzable groups and hydroxyl groups, these groups may be the same or different. The crosslinking silyl group may comprise one or more silicon atoms as constituents thereof and, when silicon atoms are linked via siloxane bonding, the number of such silicon atoms may be up to about 20.

The alkenyl group of general formula (2) in the alkenyl-terminated polymer is now described in further detail. First, there may be mentioned alkenyl groups of the general formula (3), which are bound to the main chain via a hydrocarbon group:

$$H_2C=C(R^4)-R^5- \quad (3)$$

wherein $R^4$ is as defined above and $R^5$ represents a direct bond, an alkylene group containing 1 to 20 carbon atoms, an arylene group containing 6 to 20 carbon atoms or an aralkylene group containing 7 to 20 carbon atoms and may containing one or more ether bonds.

Specific examples of $R^5$ other than a direct bond include, but are not limited to,

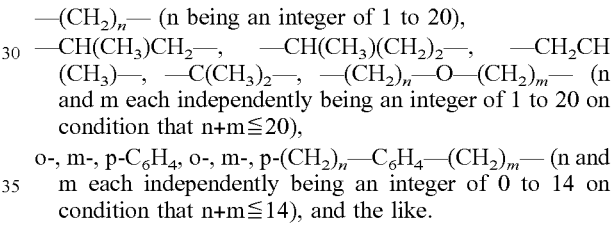

$-(CH_2)_n-$ (n being an integer of 1 to 20),
$-CH(CH_3)CH_2-$, $-CH(CH_3)(CH_2)_2-$, $-CH_2CH(CH_3)-$, $-C(CH_3)_2-$, $-(CH_2)_n-O-(CH_2)_m-$ (n and m each independently being an integer of 1 to 20 on condition that n+m≦20), o-, m-, p-$C_6H_4$, o-, m-, p-$(CH_2)_n-C_6H_4-(CH_2)_m-$ (n and m each independently being an integer of 0 to 14 on condition that n+m≦14), and the like.

The alkenyl group of general formula (2) further includes alkenyl groups of the general formula (4) which are bound to the main chain via an ether bond, alkenyl groups of the general formula (5) or (6) which are bound to the main chain via an ester bond and, further, alkenyl groups of the general formula (7) which are bound to the main chain via a carbonate group:

$$H_2C=C(R^4)-R^5-O- \quad (4)$$

$$H_2C=C(R^4)-R^5-OC(O)- \quad (5)$$

$$H_2C=C(R^4)-R^5-C(O)O- \quad (6)$$

$$H_2C=C(R^4)-R^5-OC(O)O- \quad (7)$$

wherein $R^4$ and $R^5$ are as defined above. As specific examples of $R^5$, those specifically mentioned hereinabove all can suitably be used.

Now, more detailed mention is made of the hydroxyl group contained in the hydroxy-terminated polymer of the invention. First, there may be mentioned a hydroxyl group bound to the main chain via a hydrocarbon group, as represented by the general formula (8):

$$HO-R^6- \quad (8)$$

wherein $R^6$ represents a direct bond, an alkylene group containing 1 to 20 carbon atoms, an arylene group containing 6 to 20 carbon atoms or an aralkylene group containing 7 to 20 carbon atoms and may contain one or more ether bonds.

Specific examples of $R^6$ other than a direct bond include, but are not limited to, —$(CH_2)_n$— (n being an integer of 1 to 20),
—$CH(CH_3)CH_2$—, —$CH(CH_3)(CH_2)_2$—, —$CH_2CH(CH_3)$—, —$C(CH_3)_2$—, —$(CH_2)_n$—O—$(CH_2)_m$— (n and m each independently being an integer of 1 to 20 on condition that n+m≦20),
—$CH(C_6H_5)$—, —$C(CH_3)(C_6H_5)$—, o- m-, p-$C_6H_4$, o-, m-, p-$(CH_2)_n$—$C_6H_4$—$(CH_2)_m$— (n and m each independently being an integer of 0 to 14 on condition that n+m≦14), and the like.

As other examples of the terminal hydroxyl group, there may be mentioned a hydroxyl group bound to the main chain via an ether bond, as represented by the general formula (9), a hydroxyl group bound to the main chain via an ester bond, as represented by the general formula (10) or (11) and, further, a hydroxyl group bound to the main chain via a carbonate bond, as represented by the general formula (12):

HO—$R^7$—O— (9)

HO—$R^7$—OC(O)— (10)

HO—$R^7$—C(O)O— (11)

HO—$R^7$—OC(O)O— (12)

wherein $R^7$ represents an alkylene group containing 1 to 20 carbon atoms, an arylene group containing 6 to 20 carbon atoms or an aralkylene group containing 7 to 20 carbon atoms and may contain one or more ether bonds. As preferred specific examples of $R^7$, there may be mentioned those mentioned above as specific examples of $R^6$ (exclusive of a direct bond).

Polymer Main Chain Synthesis

The main chain of the vinyl polymer of the present invention is preferably, but is not limited to, one produced by living radical polymerization.

Living radical polymerization is the radical polymerization in which the polymer terminus retains its activity without losing it. In a narrow sense of the term, living polymerization means the polymerization in which the terminus always retain its activity but, generally, the term also include the pseudo-living polymerization in which the inactivated termini and activated termini are in an equilibrium state. The latter definition is applied in the present invention. In recent years, various groups have been engaged in extensive studies of living radical polymerization. As examples, there may be mentioned the use of a cobalt-porphyrin complex (J. Am. Chem. Soc., 1994, 116, 7943), the use of a radical scavenger such as a nitroxide compound (Macromolecules, 1994, 27, 7228), and atom transfer radical polymerization using an organohalogen compounds or the like as an initiator and a transition metal complex as a catalyst. In the practice of the present invention, there is no particular limitation as to which of these techniques should be employed. In view of the ease of control, among others, the technique of atom transfer radical polymerization is preferred. The atom transfer radical polymerization is carried out using an organohalogen compound, a halogenated sulfonyl compound or the like as an initiator and a metal complex containing a transition metal as the central atom as a catalyst.(See, for example, Matyjaszewski et al., J. Am. Chem. Soc., 1995, 117, 5614, Macromolecules, 1995, 28, 7901, Science, 1996, 272, 866; International Publication Patent WO96/30421 and WO97/18247; Sawamoto et al., Macromolecules, 1995, 28, 1721). When these techniques are employed, despite the fact that the rate of polymerization is generally high and that the reaction involved is radical polymerization which tends to allow termination reactions such as coupling of radicals with each other, the polymerization proceeds in a living manner, giving polymers with a narrow molecular weight distribution (i.e. a Mw/Mn ratio of about 1.1 to 1.5), and the molecular weight can be controlled arbitrarily by selecting the monomer/initiator charge ratio.

In carrying out said atom transfer radical polymerization, the use of an organohalogen compound, in particular an organohalogen compound having a highly reactive carbon-halogen bond (e.g. an ester compound having a halogen at the α-position, or a compound having a halogen at the benzyl position) or a halogenated sulfonyl compound as an initiator is preferred.

The transition metal complex to be used as a catalyst in the above living radical polymerization is not limited to any particular species but includes, as preferred species, group 7, 8, 9, 10 or 11 transition metal complexes, more preferably complexes of copper(0), copper(I), ruthenium(II), iron(II) or nickel(II). Among these, copper complexes are preferred. Specific examples of the copper(I) compound are cuprous chloride, cuprous bromide, cuprous iodide, cuprous cyanide, cuprous oxide and cuprous perchlorate. When a copper compound is used, a ligand such as 2,2'-bipyridyl or a derivative thereof, 1,10-phenanthroline or a derivative thereof, tetramethylethylenediamine, pentamethyldiethylenetriamine, hexamethyltris(2-aminoethyl)amine or the like polyamine is added for increasing the catalyst activity. Ruthenium(II) chloride-tristriphenylphosphine complex ($RuCl_2(PPh_3)_3$) is also suited as a catalyst. In cases where a ruthenium compound is used as a catalyst, an aluminum alkoxide is added as an activator. Further, a bistriphenylphosphine complex of iron(II) ($FeCl_2(PPh_3)_2$), a bistriphenylphosphine complex of nickel(II) ($NiCl_2(PPh_3)_2$) and a bistributylphosphine complex of nickel(II) ($NiBr_2(PBu_3)_2$) are also suited as catalysts.

In carrying out this polymerization method, an organohalogen compound or a halogenated sulfonyl compound is generally used as an initiator. Specific examples are $C_6H_5$—$CH_2X$, $C_6H_5$—C(H)(X)$CH_3$, $C_6H_5$—C(X)$(CH_3)_2$ (wherein $C_6H_5$ is a phenyl group and X is a chlorine, bromine or iodine atom); $R^8$—C(H)(X)—$CO_2R^9$, $R^8$—C($CH_3$)(X)—$CO_2R^9$, $R^8$—C(H)(X)—C(O)$R^9$, $R^8$—C($CH_3$)(X)—C(O)$R^9$ (wherein $R^8$ and $R^2$ are the same or different and each is a hydrogen atom or an alkyl, aryl or aralkyl group containing up to 20 carbon atoms and X is a chlorine, bromine or iodine atom); and $R^8$—$C_6H_4$—$SO_2X$ (wherein $R^8$ is a hydrogen atom or an alkyl, aryl or aralkyl group containing up to 20 carbon atoms and X is a chlorine, bromine or iodine atom).

For producing polymers having two or more terminal structures of the present invention per molecule, the use of an organohalogen compound or halogenated sulfonyl compound having two or more initiation sites is preferred as an initiator. Specific examples are o,m,p-  X—$CH_2$—$C_6H_4$—$CH_2$—X  (i-1)

o,m,p-  X—$\overset{CH_3}{\underset{|}{C}}H_2$—$C_6H_4$—$\overset{CH_3}{\underset{|}{C}}H_2$—X  (i-2)

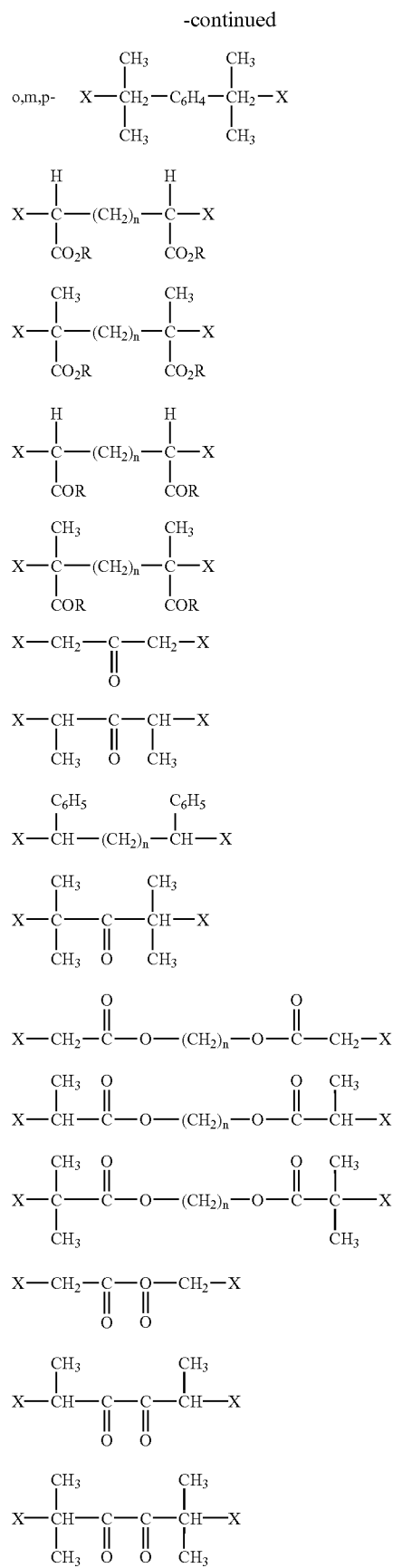
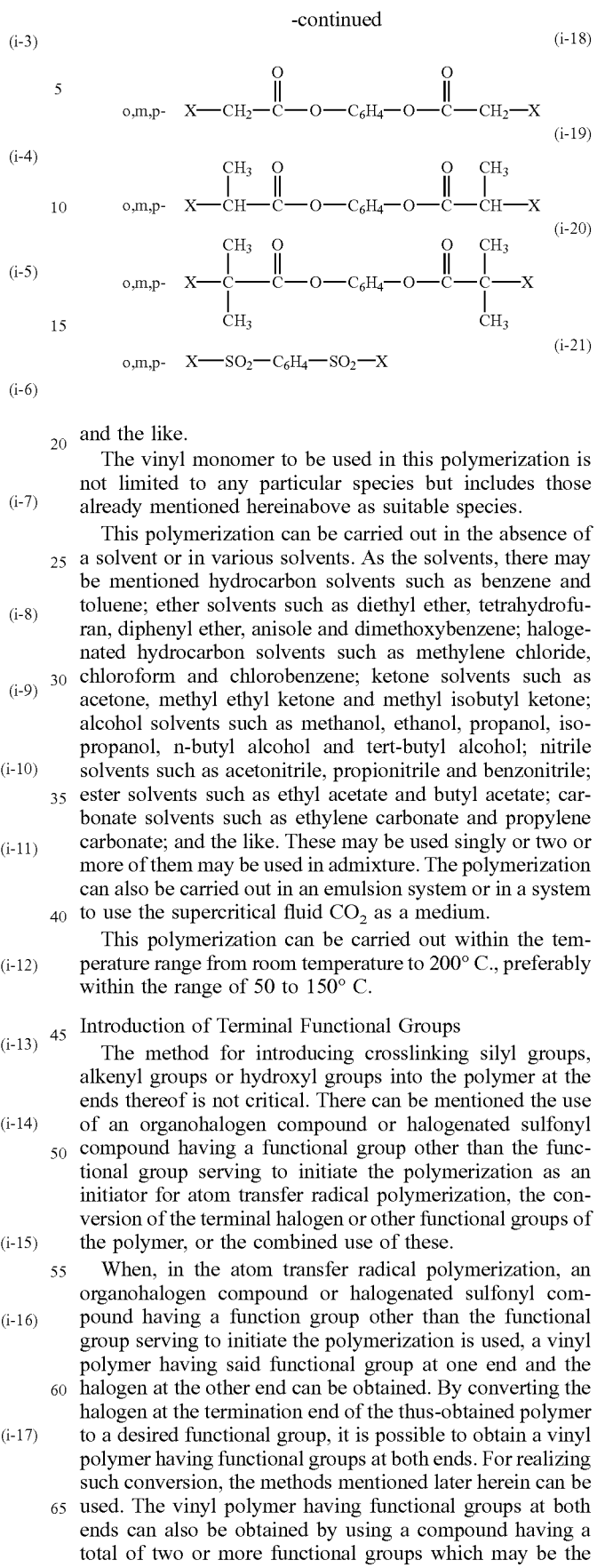

and the like.

The vinyl monomer to be used in this polymerization is not limited to any particular species but includes those already mentioned hereinabove as suitable species.

This polymerization can be carried out in the absence of a solvent or in various solvents. As the solvents, there may be mentioned hydrocarbon solvents such as benzene and toluene; ether solvents such as diethyl ether, tetrahydrofuran, diphenyl ether, anisole and dimethoxybenzene; halogenated hydrocarbon solvents such as methylene chloride, chloroform and chlorobenzene; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; and the like. These may be used singly or two or more of them may be used in admixture. The polymerization can also be carried out in an emulsion system or in a system to use the supercritical fluid $CO_2$ as a medium.

This polymerization can be carried out within the temperature range from room temperature to 200° C., preferably within the range of 50 to 150° C.

Introduction of Terminal Functional Groups

The method for introducing crosslinking silyl groups, alkenyl groups or hydroxyl groups into the polymer at the ends thereof is not critical. There can be mentioned the use of an organohalogen compound or halogenated sulfonyl compound having a functional group other than the functional group serving to initiate the polymerization as an initiator for atom transfer radical polymerization, the conversion of the terminal halogen or other functional groups of the polymer, or the combined use of these.

When, in the atom transfer radical polymerization, an organohalogen compound or halogenated sulfonyl compound having a function group other than the functional group serving to initiate the polymerization is used, a vinyl polymer having said functional group at one end and the halogen at the other end can be obtained. By converting the halogen at the termination end of the thus-obtained polymer to a desired functional group, it is possible to obtain a vinyl polymer having functional groups at both ends. For realizing such conversion, the methods mentioned later herein can be used. The vinyl polymer having functional groups at both ends can also be obtained by using a compound having a total of two or more functional groups which may be the same or different with each other and which are capable of substituting for the terminal halogen of said polymer to thereby causing coupling of two or more halogen termini together. This compound for coupling is not limited to any particular species but include, as preferred species, polyols, polyamines, polycarboxylic acids, polythiols, salts of these, alkali metal sulfides and the like.

Referring to the functional group-containing organohalogen or halogenated sulfonyl compound mentioned above, the functional group includes, among others, alkenyl, crosslinking silyl, hydroxyl, epoxy, amino and amido groups.

The alkenyl-containing organohalogen compound includes, but is not limited to, compounds having the structure represented by the general formula (13):

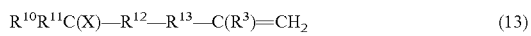

$$R^{10}R^{11}C(X)-R^{12}-R^{13}-C(R^3)=CH_2 \qquad (13)$$

wherein $R^3$ is hydrogen or methyl, $R^{10}$ and $R^{11}$ each is hydrogen or a monovalent alkyl, aryl or aralkyl group containing up to 20 carbon atoms or combinedly represent a divalent group derived from two such groups by mutual ligation at respective other ends, $R^{12}$ is —C(O)O— (ester group), —C(O)— (keto group) or o-, m- or p-phenylene, $R^{13}$ is a direct bond or a divalent organic group containing 1 to 20 carbon atoms which may optionally contain one or more ether bonds, and X is chlorine, bromine or iodine, for instance.

As specific examples of the substituents $R^{10}$ and $R^{11}$, there may be mentioned hydrogen, methyl, ethyl, n-propyl, isopropyl, butyl, pentyl and hexyl. $R^{10}$ and $R^{11}$ may form a ring skeleton resulting from mutual ligation at respective other ends.

As specific examples of the alkenyl-containing organohalogen compound of general formula (13), there may be mentioned
XCH$_2$C(O)O(CH$_2$)$_n$CH=CH$_2$,
H$_3$CC(H)(X)C(O)O(CH$_2$)$_n$CH=CH$_2$,
(H$_3$C)$_2$C(X)C(O)O(CH$_2$)$_n$CH=CH$_2$,
CH$_3$CH$_2$C(H)(X)C(O)O(CH$_2$)$_n$CH=CH$_2$,

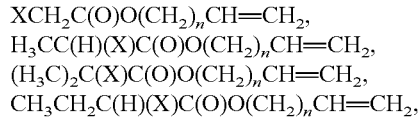

(in each of the above formulas, X is chlorine, bromine or iodine and n is an integer of 0 to 20),
XCH$_2$C(O)O(CH$_2$)$_n$O(CH$_2$)$_m$CH=CH$_2$,
H$_3$CC(H)(X)C(O)O(CH$_2$)$_n$O(CH$_2$)$_m$CH=CH$_2$,
(H$_3$C)$_2$C(X)C(O)O(CH$_2$)$_n$O(CH$_2$)$_m$CH=CH$_2$,
CH$_3$CH$_2$C(H)(X)C(O)O(CH$_2$)$_n$O(CH$_2$)$_m$CH=CH$_2$,

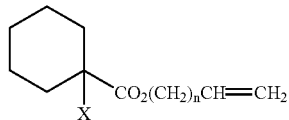

(in each of the above formulas, X is chlorine, bromine or iodine, n is an integer of 1 to 20, and m is an integer of 0 to 20),
o, m, p-XCH$_2$—C$_6$H$_4$—(CH$_2$)$_n$—CH=CH$_2$,
o, m, p-CH$_3$C(H)(X)—C$_6$H$_4$—(CH$_2$)$_n$—CH=CH$_2$,
o, m, p-CH$_3$CH$_2$C(H)(X)—C$_6$H$_4$—(CH$_2$)$_n$—CH=CH$_2$, (in each of the above formulas, X is chlorine, bromine or iodine and n is an integer of 0 to 20),
o, m, p-XCH$_2$—C$_6$H$_4$—(CH$_2$)$_n$—O—(CH$_2$)$_m$—CH=CH$_2$,
o, m, p-CH$_3$C(H)(X)—C$_6$H$_4$—(CH$_2$)$_n$—O—(CH$_2$)$_m$—CH=CH$_2$,
o, m, p-CH$_3$CH$_2$C(H)(X)—C$_6$H$_4$—(CH$_2$)$_n$—O—(CH$_2$)$_m$CH=CH$_2$, (in each of the above formulas, X is chlorine, bromine or iodine, n is an integer of 1 to 20, and m is an integer of 0 to 20),
o, m, p-XCH$_2$—C$_6$H$_4$—O—(CH$_2$)$_n$—CH=CH$_2$,
o, m, p-CH$_3$C(H)(X)—C$_6$H$_4$—O—(CH$_2$)$_n$—CH=CH$_2$,
o, m, p-CH$_3$CH$_2$C(H)(X)—C$_6$H$_4$—O—(CH$_2$)$_n$—CH=CH$_2$, (in each of the above formulas, X is chlorine, bromine or iodine and n is an integer of 0 to 20),
o, m, p-XCH$_2$—C$_6$H$_4$—O—(CH$_2$)$_n$—O—(CH$_2$)$_m$—CH=CH$_2$,
o, m, p-CH$_3$C(H)(X)—C$_6$H$_4$—O—(CH$_2$)$_n$—O—(CH$_2$)$_m$—CH=CH$_2$,
o, m, p-CH$_3$CH$_2$C(H)(X)—C$_6$H$_4$—O—(CH$_2$)$_n$—O—(CH$_2$)$_m$—CH=CH$_2$, (in each of the above formulas, X is chlorine, bromine or iodine, n is an integer of 1 to 20, and m is an integer of 0 to 20).

As further examples of the alkenyl-containing organohalogen compound, there may be mentioned compounds of general formula (14):

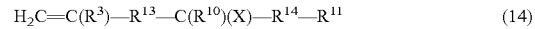

$$H_2C=C(R^3)-R^{13}-C(R^{10})(X)-R^{14}-R^{11} \qquad (14)$$

wherein $R^3$, $R^{10}$, $R^{11}$, $R^{13}$ and X are as defined above and $R^{14}$ represents a direct bond, —C(O)O— (ester bond), —C(O)— (keto bond) or o-, m- or p-phenylene.

$R^{13}$ is a direct bond or an divalent organic group containing 1 to 20 carbon atoms (which may contain one or more ether bonds). When it is a direct bond, the vinyl group is bound to the halogen-carrying carbon atom, forming a halogenated allyl compound. In that case, the carbon-halogen bond is activated by the adjacent vinyl group and therefore the C(O)O or phenylene group as $R^{14}$ is not always necessary but a direct bond may suffice. In cases where $R^{13}$ is other than a direct bond, the occurrence of a C(O)O, C(O) or phenylene group as $R^{14}$ is preferred for the activation of the carbon-halogen bond.

Specific examples of the compound of general formula (14) are:
CH$_2$=CHCH$_2$X, CH$_2$=C(CH$_3$)CH$_2$X, CH$_2$=CHC(H)(X)CH$_3$,
CH$_2$=C(CH$_3$)C(H)(X)CH$_3$, CH$_2$=CHC(X)(CH$_3$)$_2$, CH$_2$=CHC(H)(X)C$_2$H$_5$,
CH$_2$=CHC(H)(X)CH(CH$_3$)$_2$, CH$_2$=CHC(H)(X)C$_6$H$_5$,
CH$_2$=CHC(H)(X)CH$_2$C$_6$H$_5$, CH$_2$=CHCH$_2$C(H)(X)—CO$_2$R,
CH$_2$=CH(CH$_2$)$_2$C(H)(X)—CO$_2$R, CH$_2$=CH(CH$_2$)$_3$C(H)(X)—CO$_2$R,
CH$_2$=CH(CH$_2$)$_8$C(H)(X)—CO$_2$R, CH$_2$=CHCH$_2$C(H)(X)—C$_6$H$_5$,
CH$_2$=CH(CH$_2$)$_2$C(H)(X)—C$_6$H$_5$, and CH$_2$=CH(CH$_2$)$_3$C(H)(X)—C$_6$H$_5$, (in each of the above formulas, X is chlorine, bromine or iodine, and R is an alkyl, aryl or aralkyl group containing up to 20 carbon atoms).

Specific examples of the alkenyl-containing halogenated sulfonyl compound are:

o-, m-, p-CH$_2$=CH—(CH$_2$)$_n$—C$_6$H$_4$—SO$_2$X,
o-, m-, p-CH$_2$=CH—(CH$_2$)$_n$—O—C$_6$H$_4$—SO$_2$X, (in each of the above formulas, X is chlorine, bromine or iodine, and n is an integer of 0 to 20), and the like.

The crosslinking silyl-containing organohalogen compound is not limited to any particular species but includes, among others, compounds having the structure of the general formula (15):

$$R^{10}R^{11}C(X)—R^{12}—R^{13}—C(H)(R^3)CH_2—[Si(R^{15})_{2-b}(Y)_bO]_m—Si(R^{16})_{3-a}(Y)_a \quad (15)$$

wherein $R^3$, $R^{10}$, $R^{11}$, $R^{12}$, $R^{13}$ and X are as defined above, $R^{15}$ and $R^{16}$ each represents an alkyl, aryl or aralkyl group containing up to 20 carbon atoms or a triorganosiloxy group of the formula (R')$_3$SiO— (in which R' is a monovalent hydrocarbon group containing 1 to 20 carbon atoms and the three R' groups may be the same or different) and when two or more $R^9$ or $R^{10}$ groups coccur, they may be the same or different; Y represents a hydroxyl group or a hydrolyzable group and when two or more Y groups occur, they may be the same or different; a represents 0, 1, 2 or 3, b represents 0, 1 or 2, and m represents an integer of 0 to 19, provided that the condition a+mb≧1 should be satisfied.

Specific examples of the compound of general formula (15) are:

XCH$_2$C(O)O(CH$_2$)$_n$Si(OCH$_3$)$_3$,
CH$_3$C(H)(X)C(O)O(CH$_2$)$_n$Si(OCH$_3$)$_3$,
(CH$_3$)$_2$C(X)C(O)O(CH$_2$)$_n$Si(OCH$_3$)$_3$,
XCH$_2$C(O)O(CH$_2$)$_n$Si(CH$_3$)(OCH$_3$)$_2$,
CH$_3$C(H)(X)C(O)O(CH$_2$)$_n$Si(CH$_3$)(OCH$_3$)$_2$,
(CH$_3$)$_2$C(X)C(O)O(CH$_2$)$_n$Si(CH$_3$)(OCH$_3$)$_2$, (in each of the above formula, X is chlorine, bromine or iodine, and n is an integer of 0 to 20), XCH$_2$C(O)O(CH$_2$)$_n$O(CH$_2$)$_m$Si(OCH$_3$)$_3$,
H$_3$CC(H)(X)C(O)O(CH$_2$)$_n$O(CH$_2$)$_m$Si(OCH$_3$)$_3$,
(H$_3$C)$_2$C(X)C(O)O(CH$_2$)$_n$O(CH$_2$)$_m$Si(OCH$_3$)$_3$,
CH$_3$CH$_2$C(H)(X)C(O)O(CH$_2$)$_n$O(CH$_2$)$_m$Si(OCH$_3$)$_3$,
XCH$_2$C(O)O(CH$_2$)$_n$O(CH$_2$)$_m$Si(CH$_3$)(OCH$_3$)$_2$,
H$_3$CC(H)(X)C(O)O(CH$_2$)$_n$O(CH$_2$)$_m$—Si(CH$_3$)(OCH$_3$)$_2$,
(H$_3$C)$_2$C(X)C(O)O(CH$_2$)$_n$O(CH$_2$)$_m$—Si(CH$_3$)(OCH$_3$)$_2$,
CH$_3$CH$_2$C(H)(X)C(O)O(CH$_2$)$_n$O(CH$_2$)$_m$—Si(CH$_3$)(OCH$_3$)$_2$, (in each of the above formula, X is chlorine, bromine or iodine, n is an integer of 1 to 20, and m is an integer of 0 to 20), o, m, p-XCH$_2$—C$_6$H$_4$—(CH$_2$)$_2$Si(OCH$_3$)$_3$,
o, m, p-CH$_3$C(H)(X)—C$_6$H$_4$—(CH$_2$)$_2$Si(OCH$_3$)$_3$,
o, m, p-CH$_3$CH$_2$C(H)(X)—C$_6$H$_4$—(CH$_2$)$_2$Si(OCH$_3$)$_3$,
o, m, p-XCH$_2$—C$_6$H$_4$—(CH$_2$)$_3$Si(OCH$_3$)$_3$,
o, m, p-CH$_3$C(H)(X)—C$_6$H$_4$—(CH$_2$)$_3$Si(OCH$_3$)$_3$,
o, m, p-CH$_3$CH$_2$C(H)(X)—C$_6$H$_4$—(CH$_2$)$_3$Si(OCH$_3$)$_3$,
o, m, p-XCH$_2$—C$_6$H$_4$—(CH$_2$)$_2$—O—(CH$_2$)$_3$Si(OCH$_3$)$_3$,
o, m, p-CH$_3$C(H)(X)—C$_6$H$_4$—(CH$_2$)$_2$—O—(CH$_2$)$_3$Si(OCH$_3$)$_3$,
o, m, p-CH$_3$CH$_2$C(H)(X)—C$_6$H$_4$—(CH$_2$)$_2$—O—(CH$_2$)$_3$Si(OCH$_3$)$_3$,
o, m, p-XCH$_2$—C$_6$H$_4$—O—(CH$_2$)$_3$Si(OCH$_3$)$_3$,
o, m, p-CH$_3$C(H)(X)—C$_6$H$_4$—O—(CH$_2$)$_3$Si(OCH$_3$)$_3$,
o, m, p-CH$_3$CH$_2$C(H)(X)—C$_6$H$_4$—O—(CH$_2$)$_3$Si(OCH$_3$)$_3$,
o, m, p-XCH$_2$—C$_6$H$_4$—O—(CH$_2$)$_2$—O—(CH$_2$)$_3$Si(OCH$_3$)$_3$,
o, m, p-CH$_3$C(H)(X)—C$_6$H$_4$—O—(CH$_2$)$_2$—O—(CH$_2$)$_3$Si(OCH$_3$)$_3$,
o, m, p-CH$_3$CH$_2$C(H)(X)—C$_6$H$_4$—O—(CH$_2$)$_2$—O—(CH$_2$)$_3$Si(OCH$_3$)$_3$, (in each of the above formulas, X is chlorine, bromine or iodine), and the like.

As further examples of the crosslinking silyl-containing organohalogen compound mentioned above, there may be mentioned compounds of the general formula (16):

$$(R^{16})_{3-a}(Y)_aSi—[OSi(R^{15})_{2-b}(Y)_b]_m—CH_2—C(H)(R^3)—R^{13}—C(R^{10})(X)—R^{14}—R^{11} \quad (16)$$

wherein $R^3$, $R^{10}$, $R^{11}$, $R^{13}$, $R^{14}$, $R^{15}$, $R^{16}$, a, b, m, X and Y are as defined above.

Specific examples of such compounds are:

(CH$_3$O)$_3$SiCH$_2$CH$_2$C(H)(X)C$_6$H$_5$,
(CH$_3$O)$_2$(CH$_3$)SiCH$_2$CH$_2$C(H)(X)C$_6$H$_5$,
(CH$_3$O)$_3$Si(CH$_2$)$_2$C(H)(X)—CO$_2$R,
(CH$_3$O)$_2$(CH$_3$)Si(CH$_2$)$_2$C(H)(X)—CO$_2$R,
(CH$_3$O)$_3$Si(CH$_2$)$_3$C(H)(X)—CO$_2$R,
(CH$_3$O)$_2$(CH$_2$)Si(CH$_2$)$_3$C(H)(X)—CO$_2$R,
(CH$_3$O)$_3$Si(CH$_2$)$_4$C(H)(X)—CO$_2$R,
(CH$_3$O)$_2$(CH$_3$)Si(CH$_2$)$_4$C(H)(X)—CO$_2$R,
(CH$_3$O)$_3$Si(CH$_2$)$_9$C(H)(X)—CO$_2$R,
(CH$_3$O)$_2$(CH$_3$)Si(CH$_2$)$_9$C(H)(X)—CO$_2$R,
(CH$_3$O)$_3$Si(CH$_2$)$_3$C(H)(X)—C$_6$H$_5$,
(CH$_3$O)$_2$(CH$_3$)Si(CH$_2$)$_3$C(H)(X)—C$_6$H$_5$,
(CH$_3$O)$_3$Si(CH$_2$)$_4$C(H)(X)—C$_6$H$_5$,
(CH$_3$O)$_2$(CH$_3$)Si(CH$_2$)$_4$C(H)(X)—C$_6$H$_5$, (in each of the above formulas, X is chlorine, bromine or iodine, and R is an alkyl, aryl or aralkyl group containing up to 20 carbon atoms), and the like.

The hydroxyl-containing organohalogen or halogenated sulfonyl compound mentioned above is not limited to any particular species but includes compounds of the following formula, for instance:

$$HO—(CH_2)_n—OC(O)C(H)(R)(X)$$

wherein X is chlorine, bromine or iodine, R is a hydrogen atom or an alkyl, aryl or aralkyl group containing up to 20 carbon atoms, and n is an integer of 1 to 20.

The amino-containing organohalogen or halogenated sulfonyl compound mentioned above is not limited to any particular species but includes compounds of the following formula, for instance:

$$H_2N—(CH_2)_n—OC(O)C(H)(R)(X)$$

wherein X is chlorine, bromine or iodine, R is a hydrogen atom or an alkyl, aryl or aralkyl group containing up to 20 carbon atoms, and n is an integer of 1 to 20.

The epoxy-containing organohalogen or halogenated 1 5 sulfonyl compound mentioned above is not limited to any particular species but includes compounds of the following formula, for instance:

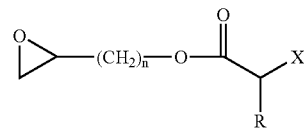

wherein X is chlorine, bromine or iodine, R is a hydrogen atom or an alkyl, aryl or aralkyl group containing up to 20 carbon atoms, and n is an integer of 1 to 20.

In the following, mention is made of the methods of introducing crosslinking silyl, alkenyl or hydroxyl groups by terminal functional group conversion. Since these functional groups serve as precursors of each other, the description is made in the order going upstream from the crosslinking silyl groups.

As the method of synthesizing the vinyl polymer having at least one crosslinking silyl group, there may be mentioned (A) the method comprising adding a hydrosilane compound having a crosslinking silyl group to a vinyl polymer having at least one alkenyl group in the presence of a hydrosilylation catalyst, (B) the method comprising reacting a vinyl polymer having at least one hydroxyl group with a compound having both a crosslinking silyl group and a group capable of reacting with a hydroxyl group, such as an isocyanato group, (C) the method comprising allowing a compound having both a polymerizable alkenyl group and a crosslinking silyl group to react on the occasion of synthesizing a vinyl polymer by radical polymerization, (D) the method comprising using a chain transfer agent containing a crosslinking silyl group on the occasion of synthesizing a vinyl polymer by radical polymerization, and (E) the method comprising reacting a vinyl polymer having at least one highly reactive carbon-halogen bond with a compound having both a crosslinking silyl group and a stable carbanion, among others.

The vinyl polymer having at least one alkenyl group, which is to be used in method (A), can be obtained by various methods. Several methods of synthesis are shown below by way of example. They have no limitative meaning, however.

(A-a) The method comprising allowing a compound having both a polymerizable alkenyl group and a poorly polymerizable alkenyl group, as represented by the general formula (17) shown below, to react as a second monomer on the occasion of synthesizing a vinyl polymer by radical polymerization:

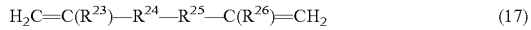

$$H_2C=C(R^{23})-R^{24}-R^{25}-C(R^{26})=CH_2 \quad (17)$$

wherein $R^{23}$ represents hydrogen or methyl, $R^{24}$ represents —C(O)O— or o-, m- or p-phenylene, $R^{25}$ represents a direct bond or a divalent organic group containing 1 to 20 carbon atoms, which may optionally contain one or more ether bonds, and $R^{26}$ represents hydrogen or an alkyl group containing 1 to 10 carbon atoms, an aryl group containing 6 to 10 carbon atoms or an aralkyl group containing 7 to 10 carbon atoms.

The time to submit to reaction the compound having both a polymerizable alkenyl group and a poorly polymerizable alkenyl group is not critical but it is preferred that said compound be submitted to reaction as the second monomer especially after living radical polymerization and, when rubber-like properties are expected, at the final stage of polymerization or after completion of the polymerization of the given first monomer.

(A-b) The method comprising submitting a compound having at least two poorly polymerizable alkenyl groups, such as 1,5-hexadiene, 1,7-octadiene or 1,9-decadiene, to reaction at the final stage of polymerization or after completion of the polymerization of the given first monomer on the occasion of synthesizing a vinyl polymer by living radical polymerization.

(A-c) The method comprising reacting various organometallic compounds having an alkenyl group, such as allyltributyltin or allyltrioctyltin, with a vinyl polymer having at least one highly reactive carbon-halogen bond, for replacing the halogen.

(A-d) The method comprising reacting a stabilized carbanion having an alkenyl group, as represented by the general formula (18) given below, with a vinyl polymer having at least one highly reactive carbon-halogen bond, for replacing the halogen:

$$M^+C^-(R^{27})(R^{28})-R^{29}-C(R^{26})=CH_2 \quad (18)$$

wherein $R^{26}$ is as defined above, $R^{27}$ and $R^{28}$ each is an electron-withdrawing group capable of stabilizing the carbanion $C^-$ or one of them is an electron-withdrawing group and the other is hydrogen, an alkyl group containing 1 to 10 carbon atoms or a phenyl group, $R^{29}$ represents a direct bond or a divalent organic group containing 1 to 10 carbon atoms, which may optionally contain one or more ether bonds, and $M^+$ represents an alkali metal ion or a quaternary ammonium ion.

Preferred as the electron-withdrawing group $R^{27}$ and/or $R^{28}$ are those having the structure —$CO_2R$, —$C(O)R$ and/or —CN.

(A-e) The method comprising reacting an elemental metal, such as zinc, or an organometallic compound with a vinyl polymer having at least one highly reactive carbon-halogen bond to thereby form an enolate anion, and then reacting this with an alkenyl-containing electrophilic compound such as an alkenyl-containing compound having a leaving group such as halogen or acetyl, an alkenyl-containing carbonyl compound, an alkenyl-containing isocyanate compound or an alkenyl-containing acid halide.

(A-f) The method comprising reacting an alkenyl-containing oxy anion or carboxylate anion represented by the general formula (19) or (20), for instance, with a vinyl polymer having at least one highly reactive carbon-halogen bond, for replacing the halogen:

$$H_2C=C(R^{26})-R^{30}-O^-M+ \quad (19)$$

wherein $R^{26}$ and $M^+$ are as defined above and $R^{30}$ is a divalent organic group containing 1 to 20 carbon atoms, which may optionally contain one or more ether bonds;

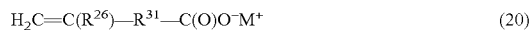

$$H_2C=C(R^{26})-R^{31}-C(O)O^-M^+ \quad (20)$$

wherein $R^{26}$ and $M^+$ are as defined above and $R^{31}$ is a direct bond or a divalent organic group containing 1 to 20 carbon atoms, which may optionally contain one or more ether bonds.

The method for synthesizing the above-mentioned vinyl polymer having at least one highly reactive carbon-halogen bond includes, but is not limited to, the atom transfer radical polymerization method using an organohalogen compound or halogenated sulfonyl compound such as mentioned above as an initiator and a transition metal complex as a catalyst.

The vinyl polymer having at least one alkenyl group can also be prepared from a vinyl polymer having at least one hydroxyl group. The method therefor includes, but is not limited to, those mentioned below. Mention thus may be made of the methods comprising reacting the hydroxyl group of a vinyl polymer having at least one hydroxyl group with (A-g) a base such as sodium methoxide, followed by reaction with an alkenyl-containing halide such as allyl chloride;

(A-h) an alkenyl-containing isocyanate such as allyl isocyanate;

(A-i) an alkenyl-containing acid halide such as (meth) acryloyl chloride in the presence of a base such as pyridine; or (A-j) an alkenyl-containing carboxylic acid such as acrylic acid in the presence of an acid catalyst.

In cases where no halogen is directly involved in the alkenyl group introduction, as in (A-a) or (A-b), it is preferable, in the practice of the present invention, to synthesize the vinyl polymer by the living radical polymerization technique. The method (A-b) is more preferred because of ease of control.

In cases where the alkenyl group introduction is realized by replacing the halogen atom of a vinyl polymer having at least one highly reactive carbon-halogen bond, the use is preferred of a vinyl polymer having at least one highly reactive terminal carbon-halogen bond obtained by radical polymerization (atom transfer radical polymerization) of a vinyl monomer using an organohalogen compound having at least one highly reactive carbon-halogen bond or a halogenated sulfonyl compound as an initiator and a transition metal complex as a catalyst. From the ease of control viewpoint, the method (A-f) is more preferred.

The crosslinking silyl-containing hydrosilane compound to be used in the method (A) is not limited to any particular species but includes, as typical examples, compounds of the general formula (21):

$$H\text{—}[Si(R^{21})_{2-b}(Y)_{b}O]_{m}\text{—}Si(R^{22})_{3-a}(Y)_{a} \qquad (21)$$

wherein $R^{21}$, $R^{22}$, a, b, m and Y are as defined above.

Among these hydrosilanes, crosslinking group-containing compounds of the general formula (22) are particularly preferred from the ready availability viewpoint:

$$H\text{—}Si(R^{22})_{3-a}(Y)_{a} \qquad (22)$$

wherein $R^{22}$, Y and a are as defined above.

In adding the crosslinking silyl-containing hydrosilane compound mentioned above to an alkenyl group, a transition metal catalyst is generally used. As the transition metal catalyst, there may be mentioned, for example, elemental platinum; solid platinum dispersed on a carrier such as alumina, silica or carbon black; chloroplatinic acid; a complex of chloroplatinic acid and an alcohol, aldehyde, ketone or the like; a platinum-olefin complex, and platinum(0)-divinyltetramethyldisiloxane complex. As catalyst other than such platinum catalysts, there may be mentioned RhCl(PPh$_3$)$_3$, RhCl$_3$, RuCl$_3$, IrCl$_3$, FeCl$_3$, AlCl$_3$, PdCl$_2$.H$_2$O, NiCl$_2$, TiCl$_4$, etc.

The method for producing a vinyl polymer having at least one hydroxyl group for use in the methods (B) and (A-g) to (A-j) includes, but is not limited to, the following.

(B-a) The method comprising submitting a compound having both a polymerizable alkenyl group and a hydroxyl group, for example a compound of the general formula (23) shown below, to reaction as a second monomer on the occasion of synthesizing a vinyl polymer by radical polymerization:

$$H_2C\text{=}C(R^{23})\text{—}R^{24}\text{—}R^{25}\text{—}OH \qquad (23)$$

wherein $R^{23}$, $R^{24}$ and $R^{25}$ are as defined above.

The time for submitting the compound having both a polymerizable alkenyl group and a hydroxyl group to reaction is not critical. Generally, however, it is preferred, when rubber-like properties are expected, that said compound be submitted to reaction as a second monomer in living radical polymerization at the final stage of polymerization or after completion of polymerization of the given first monomer.

(B-b) The method comprising submitting an alkenyl alcohol, such as 10-undecenol, 5-hexenol or allyl alcohol, to reaction on the occasion of synthesizing a vinyl polymer by living radical polymerization at the final stage of polymerization or after completion of polymerization of the given first monomer.

(B-c) The method comprising subjecting a vinyl monomer to radical polymerization using a large amount of a hydroxyl-containing chain transfer agent, such as a hydroxyl-containing polysulfide, as disclosed, for example, in Japanese Kokai Publication Hei-05-262808.

(B-d) The method comprising subjecting a vinyl monomer to radical polymerization using hydrogen peroxide or a hydroxyl-containing initiator, as disclosed, for example, in Japanese Kokai Publication Hei-06-239912 and Hei-08-283310.

(B-e) The method comprising subjecting a vinyl monomer to radical polymerization using an excessive amount of an alcohol, as disclosed, for example, in Japanese Kokai Publication Hei-06-116312.

(B-f) The method comprising hydrolyzing the halogen of a vinyl polymer having at least one highly reactive carbon-halogen bond or reacting a hydroxyl-containing compound with said halogen to thereby attain terminal hydroxyl introduction, as disclosed, for example, in Japanese Kokai Publication Hei-04-132706.

(B-g) The method comprising reacting a vinyl polymer having at least one highly reactive carbon-halogen bond with a hydroxyl-containing stabilized carbanion such as the one represented by the general formula (24), for replacing the halogen:

$$M^{+}C^{-}(R^{27})(R^{28})\text{—}R^{29}\text{—}OH \qquad (24)$$

wherein $R^{27}$, $R^{28}$ and $R^{29}$ are as defined above.

Particularly preferred as the electron-withdrawing groups $R^{27}$ and $R^{28}$ are those having the structure —CO$_2$R, —C(O)R or —CN.

(B-h) The method comprising reacting an elemental metal such as zinc or an organometallic compound with a vinyl polymer having at least one highly reactive carbon-halogen bond to give an enolate anion and then reacting the latter with an aldehyde or ketone.

(B-i) The method comprising reacting a hydroxyl-containing oxy anion or carboxylate anion represented by the general formula (25) or (26), for instance, with a vinyl polymer having at least one highly reactive carbon-halogen bond, for replacing the halogen:

$$HO\text{—}R^{30}\text{—}O^{-}M^{+} \qquad (25)$$

wherein $R^{30}$ and $M^{+}$ are as defined above;

$$HO\text{—}R^{31}\text{—}C(O)O^{-}M^{+} \qquad (26)$$

wherein $R^{31}$ and $M^{+}$ are as defined above.

In cases where no halogen is directly involved in the method of hydroxyl introduction, as in (B-a) to (B-e), it is preferred, in the practice of the present invention, that the vinyl polymer be synthesized by the living radical polymerization technique. The method (B-b) is more preferred because of ease of control.

In cases where hydroxyl group introduction is realized by conversion of the halogen of a vinyl polymer having at least one highly reactive carbon-halogen bond, the use is preferred of a vinyl polymer having at least one highly reactive terminal carbon-halogen bond as obtained by radical polymerization (atom transfer radical polymerization) of a vinyl monomer using an organohalogen compound or a halogenated sulfonyl compound as an initiator and a transition metal complex as a catalyst. From the ease of control viewpoint, the method (B-i) is more preferred.

As the compound having both a crosslinking silyl group and a group capable of reacting with a hydroxyl group, such as an isocyanato group, which is to be used in the method (B), there may be mentioned, for example, γ-isocyanatopropyltrimethoxysilane, γ-isocyanatopropylmethyldimethoxysilane and γ-isocyanatopropyltriethoxysilane. Any of conventional urethane formation catalysts may be used as necessary.

The compound having both a polymerizable alkenyl group and a crosslinking silyl group, which is to be used in the method (C), includes, for example, trimethoxysilylpropyl (meth)acrylate, methyldimethoxysilylpropyl (meth)acrylate and like compounds represented by the general formula (27):

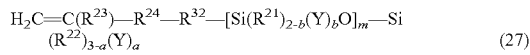

$$H_2C=C(R^{23})-R^{24}-R^{32}-[Si(R^{21})_{2-b}(Y)_bO]_m-Si(R^{22})_{3-a}(Y)_a \quad (27)$$

wherein $R^{21}$, $R^{22}$, $R^{23}$, $R^{24}$, Y, a, b and m are as defined above, and $R^{32}$ represents a direct bond or a divalent organic group containing 1 to 20 carbon atoms, which may optionally contain one or more ether bonds.

The time to submit the compound having both a polymerizable alkenyl group and a crosslinking silyl to reaction is not critical. When rubber-like properties are desired, it is preferred that said compound be submitted to reaction as a second monomer in living radical polymerization at the final stage of polymerization or after completion of the polymerization of the given first monomer.

The crosslinking silyl-containing chain transfer agent to be used in the chain transfer agent technique (D) includes, for example, crosslinking silyl-containing mercaptans, crosslinking silyl-containing hydrosilanes and the like, as disclosed in Japanese Kokoku Publication Hei-03-14068 and Hei-04-55444.

The method for synthesizing the vinyl polymer having at least one highly reactive carbon-halogen bond, which is to be used in the method (E), is not limited but includes the atom transfer radical polymerization method using an organohalogen compound or halogenated sulfonyl compound such as mentioned above as an initiator and a transition metal complex as a catalyst.

As the compound having both a crosslinking silyl group and a stabilized carbanion, which is to be used in the method (E), there may be mentioned compounds of the general formula (28):

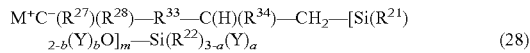

$$M^+C^-(R^{27})(R^{28})-R^{33}-C(H)(R^{34})-CH_2-[Si(R^{21})_{2-b}(Y)_bO]_m-Si(R^{22})_{3-a}(Y)_a \quad (28)$$

wherein $R^{21}$, $R^{22}$, $R^{27}$, $R^{28}$, Y, a, b and m are as defined above, $R^{33}$ represents a direct bond or a divalent organic group containing 1 to 10 carbon atoms, which may optionally contain one or more ether bonds, and $R^{34}$ represents hydrogen or an alkyl group containing 1 to 10 carbon atoms, an aryl group containing 6 to 10 carbon atoms or an aralkyl group containing 7 to 10 carbon atoms.

The electron-withdrawing groups $R^{27}$ and $R^{28}$ most preferably have the structure $-CO_2R$, $-C(O)R$ or $-CN$.

The polymer synthesized in the above manner is a vinyl polymer having a very narrow molecular weight distribution. Therefore, its viscosity is lower as compared with those polymers equivalent in number average molecular weight but broader in molecular weight distribution, hence it is easy to handle in using it in curable compositions.

Applications

Typical applications of the polymer of the present invention are described in the following according to the terminal functional group species thereof. However, the applications of the polymer of the invention are not limited thereto.

The terminal crosslinking silyl-containing vinyl polymer of the present invention can be crosslinked and cured by forming siloxane bonds in the presence or absence of various conventional condensation catalysts. The state of the cured product may range widely from rubber-like to resinous according to the molecular weight and main chain skeleton of the polymer. Therefore, this polymer can be utilized in sealing materials, adhesives, elastic adhesives, pressure sensitive adhesives, paints, powder coatings, foamed moldings, potting agents for electric and electronic use, films, gaskets, various molding materials and so forth.

The terminal alkenyl-containing vinyl polymer of the present invention gives cured products either by itself or when an appropriate curing agent is used.

In particular, the terminal (meth)acryloyl-containing vinyl polymer gives cured products upon heating in the presence of absence of various polymerization initiators. It is also crosslinked and cured upon light irradiation in the presence of various photopolymerization initiators.

As the curing agent for the terminal alkenyl-containing vinyl polymer, various polyvalent hydrogensilicon compounds can be used. In that case, conventional hydrosilylation catalysts can be used as catalysts for the curing reaction.

Curing of the terminal alkenyl-containing vinyl polymer of the present invention gives products widely ranging from rubber-like to resinous forms depending on the molecular weight and main chain skeleton thereof. Typical applications of the cured products include sealing agents, adhesives, pressure sensitive adhesives, elastic adhesives, paints, powder coatings, foamed moldings, potting agents for electric and electronic use, films, gaskets, various molding materials, artificial marbles and so forth.

The terminal hydroxyl-containing vinyl polymer of the present invention is uniformly cured when a compound having two or more functional groups capable of reacting with the hydroxyl group is used as a curing agent. Typical examples of the curing agent are polyisocyanate compounds as having two or more isocyanato groups per molecule, methylolmelamines and alkyl ethers or low condensates thereof and like aminoplast resins, polyfunctional carboxylic acids and halides thereof, and the like. In producing cured products using these curing agents, appropriate curing catalysts may be used.

Curing of the terminal hydroxyl-containing vinyl polymer of the present invention can give cured products ranging widely from rubber-like to resinous forms depending on the molecular weight and main chain skeleton thereof. Typical applications of the cured products include sealing materials, adhesives, pressure sensitive adhesives, elastic adhesives, paints, powder coatings, foamed moldings, potting agents for electric and electronic use, films, gaskets, various molding materials, artificial marbles and so on.

The crosslinking silyl-, alkenyl- or hydroxyl-terminated vinyl polymer of the present invention is produced by utilizing the living radical polymerization technique and, therefore, shows a narrow molecular weight distribution. It has a lower viscosity as compared with those polymers produced by ordinary radical polymerization techniques and having an equivalent molecular weight, hence curable compositions containing it are expected to be easy to handle.

BEST MODES FOR CARRYING OUT THE INVENTION

The following examples further illustrate the vinyl polymer of the present invention. They are, however, by no means limitative of the scope thereof.

PRODUCTION EXAMPLE 1

Production of 2-allyloxyethyl methacrylate

A three-necked flask equipped with stirrer, thermometer, reflux condenser and Dean-Stark trap is charged with methacrylic acid (137.7 g, 1.6 mol), ethylene glycol monoallyl ether (80.7 g, 0.8 mol), p-toluenesulfonic acid (0.76 g, 4.0 mmol) and toluene (650 mL). After allowing the reaction to proceed at 120° C. for 5 hours, 0.12 g of p-toluenesulfonic acid is added, and the reaction is further allowed to proceed at the same temperature for 6 hours. Then, 0.1 g of p-toluenesulfonic acid is added, and the reaction is further allowed to proceed at the same temperature for 9 hours, whereupon the reaction is completed. During the whole reaction period, methacrylic acid and ethylene glycol monoallyl ether are monitored with liquid chromatography. The final conversion amounted to 98%. The reaction mixture is neutralized by adding an aqueous solution of $NaHCO_3$ and allowed to separate into two layers. The aqueous layer is extracted once with toluene. The combined organic layer is dried over $CaCl_2$ and the volatile matter is distilled off under reduced pressure. The crude product is distilled under reduced pressure (60° C., 2 mmHg) to give 98.7 g (73% yield) of 2-allyloxyethyl methacrylate shown below.

$H_2C=C(CH_3)CO_{2(CH2)2}OCH_2CH=CH_2$

PRODUCTION EXAMPLE 2

Production of Alkenyl-containing Carboxylic Salt (1)

To 1/2 N-potassium hydroxide/ethanol (200 mL) is added undecylenic acid (18.8 g, 0.102 mol) slowly dropwise at 0° C. with constant stirring. The volatile matter is then distilled off to give a crude product. This crude product is washed with acetone and heated in vacuo to provide potassium undecylenate of the following formula as white solid (8.88 g, yield 88%).

$CH_2=CH-(CH_2)_8-CO_2^-K^+$

PRODUCTION EXAMPLE 3

Production of Alkenyl-containing Carboxylic Salt (2)

Into methanol (245 mL) is added 4-pentenoic acid (49 g, 0.489 mol) and potassium tert-butoxide (54.9 g, 0.489 mol), and the mixture is stirred at 0° C. The volatile matter is then distilled off under reduced pressure to provide potassium 4-petenoate of the following formula.

$CH_2=CH-(CH_2)_2-CO_2^-K^+$

PRODUCTION EXAMPLE 4

Production of Hydroxyl-containing Initiator

In a nitrogen atmosphere, 2-bromopropionyl chloride (2 mL, 3.35 g, 19.5 mmol) is added dropwise slowly at 0° C. to a THF (tetrahydrofuran) solution (10 mL) of ethylene glycol (10.9 mL, 195 mmol) and pyridine (3 g, 39 mmol). The solution is stirred at that temperature for 2 hours. Dilute hydrochloric acid (20 mL) and ethyl acetate (30 mL) are added and the mixture is allowed to separate into two layers. The organic layer is washed with dilute hydrochloric acid and brine and dried over $Na_2SO_4$, and the volatile matter is then distilled off under reduced pressure to give a crude product (3.07 g). This crude product is distilled under reduced pressure (70~73° C., 0.5 mmHg) to give hydroxyethyl 2-bromopropionate of the formula shown below (2.14 g, 56%):

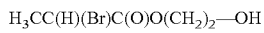

$H_3CC(H)(Br)C(O)O(CH_2)_2-OH$

PRODUCTION EXAMPLE 5

Production of Alkenyl-containing Initiator (1)

A 50-mL two-necked flask is purged with nitrogen and then charged with 2-allyloxyethanol (2.5 mL, 23.4 mmol), pyridine (3 mL) and THF (10 mL). The solution is cooled to 0° C., and 2-bromopropionyl chloride (2 mL, 19.52 mmol) is added dropwise slowly. The resulting mixture is stirred at that temperature for an hour, then ethyl acetate (10 mL) is added, and the resulting pyridine hydrochloride is filtered off. The filtrate is washed with dilute hydrochloric acid (10 mL), then with an aqueous solution of $NaHCO_3$ (10 mL) and further with brine (10 mL). The organic layer is dried over $Na_2SO_4$ and the volatile matter is distilled off under reduced pressure. The crude product thus obtained is distilled under reduced pressure to give allyloxyethyl 2-bromopropionate (78.5–81° C. (1.3 mmHg), 2.986 g) of the formula shown below.

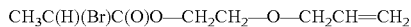

$CH_3C(H)(Br)C(O)O-CH_2CH_2-O-CH_2CH=CH_2$

EXAMPLE 1

A one-liter pressure reaction vessel is charged with n-butyl acrylate (112 mL, 100 g, 0.78 mol), the hydroxyl-containing initiator obtained in Production Example 4 (3.07 g, 15.6 mmol), cuprous bromide (2.24 g, 15.6 mmol), 2,2'-bipyridyl (4.87 g, 31.2 mmol), ethyl acetate (90 mL) and acetonitrile (20 mL). After dissolved oxygen elimination by bubbling with nitrogen, the reaction vessel is sealed. The mixture is heated at 130° C. for 2 hours to allow the reaction to proceed. The reaction vessel is cooled to room temperature, 2-hydroxyethyl methacrylate (3.92 mL, 4.06 g, 31.2 mmol) is added, and the reaction is allowed to proceed at 110° C. for 2 hours. The reaction mixture is diluted with ethyl acetate (200 mL), the insoluble matter is filtered off, and the filtrate is washed twice with 10% hydrochloric acid and once with brine. The organic layer is dried over $Na_2SO_4$, and the solvent is distilled off under reduced pressure to give 82 g of a hydroxyl-terminated poly(n-butyl acrylate). The polymer has a number average molecular weight of 5,100 (polystyrene equivalent) as determined by GPC, with a molecular weight distribution of 1.29.

Then, undecenoyl chloride (7.22 mL, 6.81 g, 33.6 mmol) is added dropwise slowly to a toluene solution (100 mL) of the hydroxyl-terminated poly(n-butyl acrylate) obtained in the above manner (50 g) and pyridine (10 mL) in a nitrogen atmosphere at 75° C., and the mixture is stirred at 75° C. for 3 hours. The resulting white precipitate is filtered off, and the organic layer is washed with dilute hydrochloric acid and brine. The organic layer is dried over $Na_2SO_4$ and concentrated under reduced pressure to give alkenyl-containing poly(n-butyl acrylate) (43 g). The polymer has a number average molecular weight of 5,400 (polystyrene equivalent) as determined by GPC, with a molecular weight distribution of 1.30. The number of alkenyl groups introduced per oligomer molecule is found to be 2.28 upon $^1$H NMR analysis.

Then, a 30-mL pressure reaction vessel is charged with the thus-obtained poly(butyl acrylate) having alkenyl groups at both ends (2 g), methyldimethoxysilane (0.32 mL), methyl orthoformate (0.09 mL, 3 equivalents relative to the alkenyl group) and platinum(0)-1,1,3,3,-tetramethyl-1,3-divinyldisiloxane complex ($8.3 \times 10^{-8}$ mol/L xylene solution, $10^{-4}$ equivalent relative to the alkenyl group), and the mixture is stirred at 100° C. for an hour. The volatile matter is distilled off to give 2 g of poly(n-butyl acrylate) having methyldimethoxysilyl groups at both ends, as represented by the formula shown below. The polymer has a number average molecular weight of 5,900 (polystyrene equivalent) as determined by GPC, with a molecular weight distribution of 1.37. The number of silyl groups introduced per oligomer molecule is 2.24 as determined by $^1$H NMR analysis.

Then, the poly(n-butyl acrylate) having methyl-dimethoxysilyl groups at both ends (one gram) as obtained in Example 1, and a curing catalyst (Nitto Kasei's U-220, dibutyltin diacetylacetonate, 30 mg) are mixed up, cast into a mold, and defoamed at room temperature using a reduced pressure drier. After 7 days of standing at room temperature, a uniform rubber-like cured product is obtained. The gel fraction is 78%.

EXAMPLE 2

Synthesis of hydroxyl-terminated poly(n-butyl acrylate)

A one-liter pressure reaction vessel is charged with n-butyl acrylate (112 mL, 100 g, 0.78 mol), the hydroxyl-containing initiator obtained in Production Example 1 (3.07 g, 15.6 mmol), cuprous bromide (2.24 g, 15.6 mmol), 2,2'-bipyridyl (4.87 g, 31.2 mmol), ethyl acetate (90 mL) and acetonitrile (20 mL). After dissolved oxygen elimination by purging with nitrogen, the reaction vessel is sealed. The mixture is heated at 130° C. for 2 hours to allow the reaction to proceed. The reaction vessel is cooled to room temperature, 2-hydroxyethyl methacrylate (3.92 mL, 4.06 g, 31.2 mmol) is added, and the reaction is allowed to proceed at 110 C for 2 hours. The reaction mixture is diluted with ethyl acetate (200 mL), the insoluble matter is filtered off, and the filtrate is washed with 10% hydrochloric acid and brine. The organic layer is dried over $Na_2SO_4$, and the solvent is distilled off under reduced pressure to give 82 g of hydroxyl-terminated poly(n-butyl acrylate). The polymer has viscosity of 25 Pa.s. The polymer has a number average molecular weight of 5,100 (mobile phase: chloroform, polystyrene equivalent) as determined by GPC, with a molecular weight distribution of 1.29. The average number of hydroxyl groups introduced per polymer molecule is found to be 2.28 upon $^1$H NMR analysis.

Synthesis of alkenyl-terminated poly(n-butyl acrylate)

Undecenoyl chloride (7.22 mL, 6.81 g, 33.6 mmol) is added dropwise slowly to a toluene solution (100 mL) of the hydroxyl-terminated poly(n-butyl acrylate) obtained above (50 g) and pyridine (10 mL) in a nitrogen atmosphere at 75° C., and the mixture is stirred at 75° C. for 3 hours. The resulting white precipitate is filtered off, and the organic layer is washed with dilute hydrochloric acid and brine. The organic layer is dried over $Na_2SO_4$ and concentrated under reduced pressure to give alkenyl-containing poly(n-butyl acrylate) (43 g). The polymer has a number average molecular weight of 5,400 (mobile phase: chloroform, polystyrene equivalent) as determined by GPC, with a molecular weight distribution of 1.30. The number of alkenyl groups introduced per polymer molecule is found to be 2.28 upon $^1$H NMR analysis.

Synthesis of crosslinking silyl-terminated poly(n-butyl acrylate)

A 30-mL pressure reaction vessel is charged with the thus-obtained poly(butyl acrylate) having alkenyl groups at both ends (2 g), methyldimethoxysilane (0.32 mL), methyl orthoformate (0.09 mL, 3 equivalents relative to the alkenyl group) and platinum bis(divinyltetramethyldisiloxane) ($8.3 \times 10^{-8}$ mol/L xylene solution, $10^{-4}$ equivalent relative to the alkenyl group), and the mixture is stirred at 100° C. for an hour. The volatile matter is distilled off to give 2 g of a crosslinking silyl-having poly(n-butyl acrylate). The polymer has a number average molecular weight of 5,900 (mobile phase: chloroform, polystyrene equivalent) as determined by GPC, with a molecular weight distribution of 1.37. The number of silyl groups introduced per polymer molecule is 2.24 as determined by $^1$H NMR analysis.

REFERENCE EXAMPLE 1

The crosslinking silyl-terminated polymer (one gram) as obtained in Example 2, and a curing catalyst (Nitto Kasei's U-220, dibutyltin diacetylacetonate, 30 mg) are mixed up, cast into a mold, and defoamed at room temperature using a reduced pressure drier. After 7 days of standing at room temperature, a uniform rubber-like cured product is obtained. The gel fraction is 78% as obtained by toluene extraction.

REFERENCE EXAMPLE 2

One hundred parts by weight of the crosslinking silyl-terminated polymer as obtained in Example 2, one part by weight of water, and one part by weight of dibutyltin dimethoxide are mixed up, cast into a mold, and defoamed at room temperature using a reduced pressure drier. After cured by heating at 50° C. for 20 hours, a uniform rubber-like cured sheet is obtained. The gel fraction is 88% as obtained by toluene extraction. Dumbbell (No. 2(1/3)) is punched out from the rubber-like cured sheet and subjected to tensile testing (200 mm/min) with autograph. The breaking strength is 0.32 Mpa and the breaking elongation is 34%.

EXAMPLE 3

Synthesis of halogen-terminated poly(n-butyl acrylate)

A 500-mL pressure reaction vessel is charged with n-butyl acrylate (112 mL, 100 g, 0.78 mol), dibromoxylene (4.12 g, 15.6 mmol), cuprous bromide (2.45 g, 15.6 mmol), 2,2'-bipyridyl (4.87 g, 31.2 mmol), ethyl acetate (90 mL) and acetonitrile (20 mL). After dissolved oxygen elimination by bubbling nitrogen gas, the vessel is sealed, and the mixture is heated at 130° C. for 2 hours to allow the reaction to proceed. After cooling to room temperature, 2-hydroxyethyl methacrylate (3.92 mL, 4.06 g, 31.2 mmol) is added, followed by reaction at 110C. for 2 hours. The reaction mixture is diluted with ethyl acetate (200 mL), and passed through an activated alumina column for removing the copper catalyst to give a bromine-terminated polymer. The polymer has a number average molecular weight of 5,700 (mobile phase: chloroform, polystyrene equivalent), with a molecular weight distribution of 1.37.

Synthesis of alkenyl-terminated poly(n-butyl acrylate)

In a nitrogen atmosphere, a 500-mL flask is charged with 84 g of the halogen-terminated poly(n-butyl acrylate) obtained above, 7.7 g (56 mmol) of potassium pentenoate, and 80 mL of DMAc. The reaction is allowed to proceed at 70° C. for 4 hours. Potassium pentenoate unreacted and potassium bromide formed in the reaction mixture is removed by water extraction to obtain an alkenyl-terminated polymer. Seventy gram of this polymer and the same weight of aluminum silicate (Kyowa Chemical's Kyowaad 700PEL) are mixed with toluene and this mixture is stirred at 100° C. The aluminum silicate is filtered off after 4 hours and the volatile matter of the filtrate is removed off by heating under reduced pressures to purify the polymer. The polymer obtained has a number average molecular weight of 4,760 (mobile phase: chloroform, polystyrene basis) as determined with GPC, and a molecular weight distribution of 1.73. The number of alkenyl groups per polymer molecule is 1.78 as determined by $^1$H NMR analysis.

Synthesis of crosslinking silyl-terminated poly(n-butyl acrylate)

A 200-mL pressure reaction vessel is charged with 60 g of the thus-obtained, alkenyl-terminated polymer, 8.4 mL (68.1 mmol) of methyldimethoxysilane, 2.5 mL (22.9 mmol) of methyl orthoformate, and platinum bis(divinyl-tetramethyl-disiloxane) (5×10$^{-3}$ mmol). The reaction is allowed to proceed at 100° C. for 4 hours to give a crosslinking silyl-having polymer. The polymer has a number average molecular weight of 6,000 (mobile phase: chloroform, polystyrene equivalent) as determined by GPC, with a molecular weight distribution of 1.44. The number of crosslinking silyl groups per polymer molecule is 1.59 as determined by $^1$H NMR analysis.

REFERENCE EXAMPLE 3

One hundred parts by weight of the crosslinking silyl-terminated polymer as obtained in Example 3, one part by weight of water, and one part by weight of dibutyltin dimethoxide are mixed up, cast into a mold having a thickness of 2 mm, and defoamed at room temperature using a reduced pressure drier. After cured by heating at 50° C. for 2 days, a uniform rubber-like cured sheet is obtained. The gel fraction is 93% as obtained by toluene extraction. Dumbbell (No. 2(1/3)) is punched out from the rubber-like cured sheet and subjected to tensile testing (200 mm/min) with autograph. The breaking strength is 0.26 Mpa and the breaking elongation is 75%.

EXAMPLE 4

Synthesis of halogen-terminated poly(n-butyl acrylate)

A 500-mL flask is charged with cuprous bromide (0.63 g, 4.4 mmol), pentamethyldiehtylenetriamine (0.76 g, 4.4 mmol), acetonitrile (5 mL), diethyl 2,5-dibromoadipate (1.6 g, 4.4 mmol), and butyl acrylate (44.7 g, 349 mmol). After carrying out freeze degassing, the reaction is allowed to proceed at 70° C. for 7 hours in a nitrogen atmosphere. The mixture is passed through an activated alumina column for removing copper catalyst to obtain a bromine-terminated polymer. The polymer obtained has a number average molecular weight of 10,700, and a molecular weight distribution of 1.15.

Synthesis of alkenyl-terminated poly(n-butyl acrylate)

In a nitrogen atmosphere, a 200-mL flask is charged with 35 g of the halogen-terminated poly(n-butyl acrylate) obtained above, 2.2 g (16.1 mmol) of potassium pentenoate, and 35 mL of DMAc. The reaction is allowed to proceed at 70° C. for 4 hours. Potassium pentenoate unreacted and potassium bromide formed in the reaction mixture is removed by water extraction to obtain an alkenyl-terminated polymer. The polymer obtained has a number average molecular weight of 11,300 as determined with GPC (mobile phase: chloroform, polystyrene basis), and a molecular weight distribution of 1.12. The number of alkenyl groups per polymer molecule is 1.82 as determined by $^1$H NMR analysis.

Synthesis of crosslinking silyl-terminated poly(n-butyl acrylate)

A 200-mL pressure reaction vessel is charged with 15 g of the thus-obtained, alkenyl-terminated polymer, 1.8 mL (14.5 mmol) of methyldimethoxysilane, 0.26 mL (2.4 mmol) of methyl orthoformate, and platinum bis(divinyl-tetramethyl-disiloxane) (10$^{-4}$ mmol). The reaction is allowed to proceed at 100° C. for 4 hours to give a crosslinking silyl-terminated polymer. The viscosity of the polymer obtained is 44 Pa.s. The polymer has a number average molecular weight of 11,900 (mobile phase: chloroform, polystyrene equivalent) as determined by GPC, with a molecular weight distribution of 1.12. The number of crosslinking silyl groups per molecule is 1.46 as determined by $^1$H NMR analysis.

REFERENCE EXAMPLE 4

One hundred parts by weight of the crosslinking silyl-terminated polymer as obtained in Example 4, one part by weight of water, and one part by weight of dibutyltin dimethoxide are mixed up, cast into a mold having a thickness of 2 mm, and defoamed at room temperature using a reduced pressure drier. After cured by heating at 50° C. for 10 days, a uniform rubber-like cured sheet is obtained. The gel fraction is 98% as obtained by toluene extraction. Dumbbell (No. 2(1/3)) is punched out from the rubber-like cured sheet and subjected to tensile testing (200 mm/min) with autograph. The breaking strength is 0.35 Mpa and the breaking elongation is 77%.

EXAMPLE 5

Synthesis of alkenyl-terminated poly(n-butyl acrylate)

A 100-mL glass reaction vessel is charged with butyl acrylate (50.0 mL, 44.7 g, 0.349 mol), cuprous bromide (1.25 g, 8.72 mmol), pentamethyldiethylenetriamine (1.82 mL, 1.51 g, 8.72 mmol), and acetonitrile (5 mL). After cooling and degassed under reduced pressures, the inside of the reaction vessel is purged with nitrogen gas. After stirring thoroughly, diethyl 2,5-dibromoadipate (1.57 g, 4.36 mmol) is added and the mixture is stirred and heated at 70° C. After 60 minutes, 1,7-octadiene (6.44 mL, 4.80 g, 43.6 mmol) is added to this mixture and heating is continued at 70° C. for 2 hours with stirring. The reaction mixture is treated with activated alumina and the volatile matter is distilled off by heating under reduced pressures. The residue is dissolved into ethyl acetate, and washed with 2% hydrochloric acid and brine. The organic layer is dried over $Na_2SO_4$ and the volatile matter is distilled off by heating under reduced pressures to give an alkenyl-terminated polymer. The polymer has a number average molecular weight of 13,100 as determined by GPC (polystyrene equivalent), with a molecular weight distribution of 1.22. The number of alkenyl groups per polymer molecule is 2.01 as determined by $^1$H NMR analysis.

Synthesis of crosslinking silyl-terminated poly(n-butyl acrylate)

The alkenyl-terminated poly(n-butyl acrylate) obtained above (3.05 g) and the same weight of aluminum silicate (Kyowa Chemical's Kyowaad 700PEL) are mixed with toluene, and stirred at 100° C. After 4 hours, aluminum silicate is filtered off and the volatile matter of the filtrate is distilled off by heating under reduced pressures to purify the polymer.

A 200-mL glass pressure reaction vessel is charged with the polymer thus purified (23.3 g), dimethoxymethylsilane (2.55 mL, 20.7 mmol), methyl orthoformate (0.38 mL, 3.45 mmol), and platinum catalyst. The amount of the platinum catalyst used is $2 \times 10^{-4}$ equivalent by molar ratio relative to the alkenyl groups of the polymer. The reaction mixture is heated at 100° C. for 3 hours. The volatile matter of the mixture is distilled off under reduced pressures to give a crosslinking silyl-terminated poly(n-butyl acrylate). The polymer has a number average molecular weight of 13,900 as determined by GPC (mobile phase: chloroform, polystyrene equivalent), with a molecular weight distribution of 1.25. The number of crosslinking silyl groups per polymer molecule is 1.58 as determined by $^1$H NMR analysis.

REFERENCE EXAMPLE 5

One hundred parts by weight of the crosslinking silyl-terminated polymer as obtained in Example 5, one part by weight of water, and one part by weight of dibutyltin dimethoxide are mixed up, cast into a mold having a thickness of 2 mm, and defoamed at room temperature using a reduced pressure drier. After cured by heating at 50° C. for 10 days, a uniform rubber-like cured sheet is obtained. The gel fraction is 85% as obtained by toluene extraction. Dumbbell (No. 2(1/3)) is punched out from the rubber-like cured sheet and subjected to tensile testing (200 mm/min) with autograph. The breaking strength is 0.34 Mpa and the breaking elongation is 86%.

EXAMPLE 6

Synthesis of halogen-terminated poly(n-butyl acrylate)

A 500-mL flask is charged with cuprous bromide (0.63 g, 4.4 mmol), pentamethyldiehtylenetriamine (0.76 g, 4.4 mmol), acetonitrile (5 mL), diethyl 2,5-dibromoadipate (0.78 g, 2.2 mmol), and butyl acrylate (44.7 g, 349 mmol). After carrying out freeze degassing, the reaction is allowed to proceed at 70° C. for 6 hours in a nitrogen atmosphere. The mixture is passed through an activated alumina column for removing copper catalyst to obtain a bromine-terminated polymer. The polymer obtained has a number average molecular weight of 23,600 as determined by GPC (mobile phase: chloroform, polystyrene basis), and a molecular weight distribution of 1.14.

Synthesis of alkenyl-terminated poly(n-butyl acrylate)

In a nitrogen atmosphere, a 200-mL flask is charged with 34 g of the bromine-terminated polymer obtained above, 1.0 g (7.6 mmol) of potassium pentenoate, and 34 mL of DMAc. The reaction is allowed to proceed at 70° C. for 4 hours. Potassium pentenoate unreacted and potassium bromide formed in the reaction mixture is removed by water extraction to obtain an alkenyl-terminated polymer. This alkenyl-terminated polymer and the same weight (30.5 g) of aluminum silicate (Kyowa Chemical's Kyowaad 700PEL) is mixed with toluene, and stirred at 100° C. After 4 hours, aluminum silicate is filtered off and the volatile matter of the filtrate is distilled off by heating under reduced pressures to purify the polymer. The polymer obtained has a number average molecular weight of 24,800 as determined with GPC (mobile phase: chloroform, polystyrene basis), and a molecular weight distribution of 1.14. The number of alkenyl groups per polymer molecule is 1.46 as determined by $^1$H NMR analysis.

Synthesis of crosslinking silyl-terminated poly(n-butyl acrylate)

A 200-mL pressure reaction vessel is charged with 21 g of the thus-obtained, alkenyl-terminated polymer, 0.94 mL (7.6 mmol) of methyldimethoxysilane, 0.13 mL (1.3 mmol) of methyl orthoformate, and platinum bis(divinyl-tetramethyl-disiloxane) ($2 \times 10^{-4}$ mmol). The reaction is allowed to proceed at 100° C. for 4 hours to give a crosslinking silyl-terminated polymer. The viscosity of the polymer obtained is 100 Pa.s. The polymer has a number average molecular weight of 25,400 (mobile phase: chloroform, polystyrene equivalent) as determined by GPC, with a molecular weight distribution of 1.16. The number of crosslinking silyl groups per polymer molecule is 1.48 as determined by $^1$H NMR analysis.

REFERENCE EXAMPLE 6

One hundred parts by weight of the crosslinking silyl-terminated polymer as obtained in Example 6, one part by weight of water, and one part by weight of dibutyltin dimethoxide are mixed up, cast into a mold having a thickness of 2 mm, and defoamed at room temperature using a reduced pressure drier. After cured by heating at 50° C. for 2 days, a uniform rubber-like cured sheet is obtained. The gel fraction is 94% as obtained by toluene extraction. Dumbbell (No. 2(1/3)) is punched out from the rubber-like cured sheet and subjected to tensile testing (200 mm/min) with autograph. The breaking strength is 0.40 Mpa and the breaking elongation is 323%.

COMPARATIVE EXAMPLE 1

Synthesis of crosslinking silyl-having poly(n-butyl acrylate) using a crosslinking silyl-containing monomer In one-litter flask, 400 g of toluene, 385 g of butyl acrylate, 15 g of methyldimethoxysilylpropyl methacrylate, and 6 g of azobisisobutyronitrile are polymerized at 105° C. for 7 hours with nitrogen bubbling. Toluene is distilled off to give a crosslinking silyl-having poly(n-butyl acrylate). The viscosity of the polymer obtained is 74 Pa.s. The polymer has a number average molecular weight of 8,500 (mobile phase: chloroform, polystyrene equivalent) as determined by GPC, with a molecular weight distribution of 2.47. The average number of crosslinking silyl groups per polymer molecule is 1.40 as determined by $^1$H NMR analysis.

COMPARATIVE REFERENCE EXAMPLE 1

One hundred parts by weight of the crosslinking silyl-having polymer as obtained in Comparative Example 1, one part by weight of water, and one part by weight of dibutyltin dimethoxide are mixed up, cast into a mold having a thickness of 2 mm, and defoamed at room temperature using a reduced pressure drier. After cured by heating at 50° C. for 10 days, a uniform rubber-like cured sheet is obtained. The gel fraction is 78% as obtained by toluene extraction. Dumbbell (No. 2(1/3)) is punched out from the rubber-like cured sheet and subjected to tensile testing (200 mm/min) with autograph. The breaking strength is 0.14 Mpa and the breaking elongation is 69%.

COMPARATIVE EXAMPLE 2

Synthesis of crosslinking silyl-having poly(n-butyl acrylate) using a crosslinking silyl-containing monomer In one-litter flask, 210 g of toluene, 293 g of butyl acrylate, 7.2 g of methyldimethoxysilylpropyl methacrylate, and 1.8 g of azobisisovaleronitrile are polymerized at 105° C. for 7 hours with nitrogen bubbling. Toluene is distilled off to give a crosslinking silyl-having poly(n-butyl acrylate). The viscosity of the polymer obtained is 110 Pa.s. The polymer has a number average molecular weight of 9,600 (mobile phase: chloroform, polystyrene equivalent) as determined by GPC, with a molecular weight distribution of 2.86.

The results of Examples 2–6 and Comparative Examples 1–2 are summarized in Table 1.

obtained (Example 7), since a polymer having a higher number average molecular weight can be obtained with substantially the same viscosity. Furthermore, since the crosslinking silyl-containing vinyl polymer is produced by living radical polymerization, the proportion of polymer molecules having no crosslinking silyl group is small even when the average number of crosslinking silyl groups per molecule is substantially the same as compared with prior art polymers; as a result, cured products having a high gel fraction can be obtained (Example 4 and Comparative Example 1).

REFERENCE EXAMPLE 7

Heat Resistance of a Cured Product

A portion of the cured sheet of crosslinking silyl-containing poly(n-butyl acrylate) as obtained in Reference Example 4 was placed in an oven maintained at 150° C. and taken out

TABLE 1

|  | Reference Example | | | | | Compar. Ref. Ex. | |
| --- | --- | --- | --- | --- | --- | --- | --- |
|  | 2 | 3 | 4 | 5 | 6 | 1 | 2 |
|  | | | Example | | | Compar. Ex. | |
| Polymer | 2 | 3 | 4 | 5 | 6 | 1 | 2 |
| Viscosity (Pa · S) | — | — | 44 | — | 100 | 74 | 110 |
| Mn | 5,900 | 6,000 | 11,900 | 13,900 | 25,400 | 8,500 | 9,600 |
| Mw/Mn | 1.37 | 1.44 | 1.12 | 1.25 | 1.16 | 2.47 | 2.86 |
| Fn | 2.24 | 1.59 | 1.46 | 1.58 | 1.48 | 1.40 | — |
| Gel fraction (%) | 88 | 93 | 98 | 85 | 94 | 78 | — |
| Breaking strength (Mpa) | 0.32 | 0.26 | 0.35 | 0.34 | 0.40 | 0.14 | — |
| Breaking elongation (%) | 34 | 75 | 77 | 86 | 323 | 69 | — |

In Table 1, Fn means the average number of crosslinking silyl groups per polymer molecule.

In application where rubber-like properties are required, it is desirable that the molecular weight of the polymer be increased so that the balance among modulus, breaking strength and elongation at break can be improved. In particular in the case of polymers having crosslinking functional groups such as those of the present invention, that tendency is strong, since the molecular weight is associated with the molecular weight between sites of crosslinking, which is an important index in rubber designing. The number average molecular weight is one of the important parameters deciding the molecular weight between crosslinking sites and it is desirable that this can be increased so that the above-mentioned physical property balance can be improved.

In the case of that vinyl polymer of the present invention which has at least one crosslinking silyl group, the molecular weight distribution can be controlled within a narrow range, so that when compared with prior art polymers having substantially the same molecular weight, said vinyl polymer has a very low viscosity, hence it is a material excellent in handling properties (the viscosity in Example 4 being not more than half of that in Comparative Example 2). Where limitations are imposed on the viscosity, cured products excellent in modulus/strength/elongation balance can be after 24 hours for observation of the surface state. The surface showed no abnormalities.

COMPARATIVE EXAMPLE 3

Synthesis of Crosslinking Silyl-terminated Polydimethylsiloxane (silicone)

A 200-mL flask was charged with 97 g of vinyl-terminated polydimethylsiloxane (DMS-V25, product of Adimax; unsaturated group equivalent 0.11 eq/kg), 2.3 g (21.4 mmol) of methyldimethoxysilane and $10^{-3}$ mmol of platinum bis (divinyltetramethyldisiloxane), and the reaction was allowed to proceed at 70° C. for 6 hours. The thus-obtained crosslinking silyl-terminated polydimethylsiloxane had a number average molecular weight of 11,900 as determined by GPC (mobile phase chloroform, polystyrene equivalent) with a molecular weight distribution of 2.52. In $^1$H-NMR analysis (300 MHz), the unsaturated group-due peak was found disappeared and the number of crosslinking silyl groups per polydimethylsiloxane polymer molecule was 2 as determined based on the intensity ratio between the methyl protons bound to the silicon atoms originating from the main chain of the polymer and the protons of the methoxysilyl groups. The viscosity was 6 poises.

COMPARATIVE REFERENCE EXAMPLE 2

Heat Resistance of a Cured Product

The crosslinking silyl-containing polymer of Comparative Example 3 (100 weight parts) was admixed with 1 weight part of water and 1 weight part of dibutyltin dimethoxide and, after thorough stirring, the mixture was poured into a mold with a thickness of 2 mm. After deforming under reduced pressure, thermal curing was effected at 50° C. for 10 days. A portion of the cured sheet obtained was placed in an oven at 150° C. and taken out after 24 hours for observation of the surface state. The surface showed no abnormalities.

COMPARATIVE EXAMPLE 4

Synthesis of Allyl-terminated Polyisobutylene

A 2-liter pressure-resistant glass polymerization vessel was purged with nitrogen and charged with 205 mL of ethylcyclohexane and 819 mL of toluene, both dried with molecular sieves, and 2.89 g (12.5 mmol) of p-dicumyl chloride.

Isobutylene monomer (332 mL, 3.91 mol) was introduced into the polymerization vessel and then 0.454 g (4.88 mmol) of 2-methylpyridine and 6.69 mL (61.0 mmol) of titanium tetrachloride were added to thereby initiate the polymerization. After 70 minutes of reaction, 6.86 g (60.0 mmol) of allyltrimethylsilane was added and the reaction was allowed to proceed for allyl group introduction into polymer termini. After 120 minutes of reaction, the reaction mixture was washed with water and the solvents were distilled off to give allyl-terminated polyisobutylene.

Synthesis of Crosslinking Silyl-terminated Polyisobutylene

A 200-g portion of the allyl-terminated polymer obtained in the above manner was heated to about 75° C., then 1.5 eq/vinyl group of methyldimethoxysilane and $5 \times 10^{-5}$ eq/vinyl group of platinum-vinylsiloxane complex were added and the hydrosilylation reaction was carried out. The reaction was monitored by FT-IR analysis. In about 20 hours, the olefin absorption at 1640 cm$^{-1}$ disappeared.

The crosslinking silyl-terminated polyisobutylene obtained had a viscosity of 360 Pa·s and a number average molecular weight of 4,800 as determined by GPC (mobile phase chloroform, polystyrene equivalent) with a molecular weight distribution of 1.52. The number of crosslinking silyl groups per polymer molecule as determined by $^1$H-NMR analysis was 1.66.

COMPARATIVE REFERENCE EXAMPLE 3

Heat Resistance of a Cured Product

The crosslinking silyl-terminated polymer of Comparative Example 4 (100 weight parts) was admixed with 1 weight part of water and 1 weight part of dibutyltin dimethoxide and, after thorough stirring, the mixture was poured into a mold with a thickness of 2 mm. After deforming under reduced pressure, thermal curing was effected at 50° C. for 10 days. A portion of the cured sheet obtained was placed in an oven at 150° C. and taken out after 24 hours for observation of the surface state. The surface was found melted, partly with exudation of a liquid.

The results of Reference Example 7 and Comparative Reference Examples 2 and 3 are summarized in Table 2.

TABLE 2

|  | Ref. Ex. 7 | Compar. Ref. Ex. 2 | Compar. Ref. Ex. 3 |
| --- | --- | --- | --- |
| Polymer | Poly (n-butyl acrylate) | Polydimethyl siloxane | Polyisobutylene |
| Heat resistance | No change | No change | Surface melt |

The cured products obtained from the crosslinking silyl-containing vinyl polymer have the same level of heat resistance as compared with silicone polymers and are superior in heat resistance to polyisobutylenes and therefore can be used in applications where heat resistance is required.

REFERENCE EXAMPLE 8

Resistance to Accelerated Weathering

A portion of the cured sheet of crosslinking silyl-containing poly(n-butyl acrylate) as obtained in Reference Example 4 was subjected to accelerated weathering test using a sunshine weather-o-meter and the surface state was observed. Even after the lapse of 1,000 hours, the surface showed neither melting nor discoloration.

COMPARATIVE REFERENCE EXAMPLE 4 and 5

The same accelerated weathering test was conducted using the silicone polymer obtained in Comparative Example 3 (Comparative Reference Example 4) or the polyisobutylene polymer obtained in Comparative Example 4 (Comparative Reference Example 5) in lieu of the cured product of crosslinking silyl-containing poly(n-butyl acrylate) as obtained in Reference Example 4. In Comparative Reference Example 4, neither surface melting nor discoloration was observed after the lapse of 1,000 hours. On the other hand, in Comparative Reference Example 5, surface melting was already found after the lapse of 500 hours.

The composition in which the crosslinking silyl-containing vinyl polymer of the present invention is used has the same level of weathering resistance as compared with silicone polymer compositions and is definitely superior to polyisobutylenes and therefore can be used in applications where weathering resistance is required.

REFERENCE EXAMPLE 9

One-pack Depth Curability

The crosslinking silyl-containing polymer (100 weight parts) obtained in Example 5 was dehydrated azeotropically with toluene. Then, in a nitrogen atmosphere, 1 weight part of methyltrimethoxysilane and 1 weight part of dibutyltin diacetylacetonate were added in sequence, and the mixture was stored in a tightly stoppered sample bottle. The thus-prepared one-pack composition was stored in a constant-temperature, constant-humidity room (23° C., 60% RH) for a week and then discharged into a sample tube. At 24 hours after discharge, the cured portion was taken out and the thickness thereof in the direction of depth was measured and found to be 3 mm.

COMPARATIVE REFERENCE EXAMPLES 6 and 7

One-pack Depth Curability

The same depth curability measurement was performed using the silicone polymer obtained in Comparative Example 3 (Comparative Reference Example 6) or the polyisobutylene polymer obtained in Comparative Example 4 (Comparative Reference Example 7) in lieu of the polymer obtained in Example 5. In Comparative Reference Example 6, the depth curability was 3 mm and, in Comparative Reference Example 7, only thin film formation was found on the surface, with no inside curing.

The composition comprising the crosslinking silyl-containing vinyl polymer of the present invention has the same level of one-pack depth curability as that of silicone-based compositions and is decidedly superior to polyisobutylene compositions, hence can be used as such a composition as a one-pack sealant.

REFERENCE EXAMPLE 10

Adhesive Property

Colloidal calcium carbonate (120 weight parts), 50 weight parts of dioctyl phthalate, 2 weight parts of amino-substituted crosslinking silyl-containing compound A-1120 (product of Nippon Unicar) and 1 weight part of dibutyltin diacetylacetonate were added to 100 weight parts of the crosslinking silyl-containing poly(n-butyl acrylate) obtained in Example 5 and, after thorough mixing, the mixture was applied, in a beadform, to a glass substrate. After 7 days of standing at room temperature, each bead was peeled off after making an incision into the interface and the adhesion property was evaluated. The state of rupture indicated cohesive failure of the cured composition.

The composition comprising the crosslinking silyl-containing vinyl polymer of the present invention is sufficient in adhesive property and can be used satisfactorily as a curable adhesive composition.

REFERENCE EXAMPLE 11

Coatability

Titanium oxide (10 weight parts), 100 weight parts of colloidal calcium carbonate, 40 weight parts of heavy calcium carbonate and a reaction mixture of 3 weight parts of stannous octoate and 0.75 weight part of laurylamine were added to 100 weight parts of the crosslinking silyl-containing poly(n-butylacrylate) obtained in Example 5 and, after thorough mixing, the mixture was made up into a sheet. On the next day following sheet preparation, the sheet was coated with an acrylic emulsion paint (Water-base Top, product of Nippon Paint) diluted with 10% of water. Coating was possible without any problem.

COMPARATIVE REFERENCE EXAMPLE 8

Coatability

The same experiment as mentioned above in Reference Example 11 was performed using the crosslinking silyl-containing polydimethylsiloxane polymer obtained in Comparative Example 3 in lieu of the crosslinking silyl-containing poly(n-butyl acrylate) obtained in Example 5. The paint applied was immediately repelled.

The composition comprising the crosslinking silyl-containing vinyl polymer of the present invention had sufficient coatability, unlike the composition comprising the silicone polymer. Therefore, it can be used as a curable composition such as a coatable sealant.

REFERENCE EXAMPLE 12

Antifouling Property

Titanium oxide (10 weight parts), 100 weight parts of colloidal calcium carbonate, 40 weight parts of heavy calcium carbonate and a reaction mixture of 3 weight parts of stannous octoate and 0.75 weight part of laurylamine were added to 100 parts of the crosslinking silyl-containing poly(n-butyl acrylate) obtained in Example 5 and, after thorough mixing, the mixture was filled into joints between granite pieces coated with a primer (No. 40, product of Yokohama Rubber), followed by outdoor exposure. After the lapse of 8 months, the joints and the surroundings were still clean.

COMPARATIVE REFERENCE EXAMPLE 9

The same experiment as mentioned above in Reference Example 12 was performed using the crosslinking silyl-containing polydimethylsiloxane polymer obtained in Comparative Example 3 in lieu of the crosslinking silyl-containing poly(n-butyl acrylate) obtained in Example 5. After the lapse of 8 months, the surroundings of the joints were found duskily stained.

The composition comprising the crosslinking silyl-containing vinyl polymer of the present invention protected granites from fouling, unlike the composition in which the silicone polymer was used. Therefore, it can be used as a curable composition such as a nonfouling sealant.

REFERENCE EXAMPLE 13

Adhesive Composition

A crosslinking silyl-containing poly(n-butyl acrylate) (100 weight parts) obtained according to the same formulation as in Example 4 was admixed with 175 weight parts (70 weight parts of rosin ester) of a 40% toluene solution of a special rosin ester (Super Ester A-100, product of Arakawa Chemical Industries) and 2 weight parts of #918 (tin catalyst, product of Sankyo Yuki) and the mixture was applied to a PET film using a coater (100 μm). After one day of standing at room temperature, the coated film was heated at 50° C. for a day. The bond strength upon 180° peeling was determined according to JIS Z 0237 and was found to be 4.5 N/25 mm.

The crosslinking silyl-containing vinyl polymer of the present invention can be used as an adhesive.

EXAMPLE 7

A 30-mL glass pressure reaction vessel is charged with butyl acrylate (5 mL, 4.47 g, 34.9 mmol), α,α'-dibromo-p-xylene (185 mg, 0.70 mmol), cuprous bromide (100 mg, 0.70 mmol), 2,2'-bipyridyl (217 mg, 1.40 mmol), ethyl acetate (4 mL) and acetonitrile (one mL). After dissolved oxygen elimination by bubbling nitrogen gas for 10 minutes, the vessel is sealed, and the mixture is heated at 130° C. for 2 hours to allow the reaction to proceed. After cooling the mixture, methyl-dimethoxysilylpropyl methacrylate (650 mg, 2.8 mmol) is added and the reaction is allowed to proceed at 100° C. for 2 hours. After cooling, the mixture is diluted with ethyl acetate (20 mL), the resulting insoluble matter is filtered off, and the filtrate is washed twice with ammonium chloride and once with brine. The organic layer is dried over $Na_2SO_4$ and the volatile matter is distilled off under reduced pressure to give 4.78 g (90%) of methyldimethoxysilyl-terminated poly(butyl acrylate). The polymer has a number average molecular weight of 7,100 (polystyrene equivalent) as determined by GPC, with a molecular weight distribution of 1.74. The number of silyl groups introduced per polymer molecule is 3.2 as determined by $^1H$ NMR analysis.

EXAMPLE 8

A one-liter pressure reaction vessel is charged with n-butyl acrylate (112 mL, 100 g, 0.78 mol), the hydroxyl-containing initiator obtained in Production Example 4 (3.07 g, 15.6 mmol), cuprous bromide (2.24 g, 15.6 mmol), 2,2'-bipyridyl (4.87 g, 31.2 mmol), ethyl acetate (89.6 mL) and acetonitrile (22.4 mL) and, after dissolved oxygen elimination by blowing with nitrogen gas for 10 minutes, the vessel is sealed. The mixture is heated at 130° C. for one hour to allow the reaction to proceed. After cooling the reaction vessel to room temperature, 2-hydroxyethyl methacrylate (3.92 mL, 4.06 g, 31.2 mmol) is added, and the reaction is allowed to proceed at 110° C. for one hour. The reaction mixture is diluted with ethyl acetate, the insoluble matter is filtered off, and the filtrate is washed three times with 10% hydrochloric acid and once with brine. The organic layer is dried over $Na_2SO_4$, and the solvent is distilled off under reduced pressures to give 82 g of a hydroxyl-terminated poly(n-butyl acrylate). The polymer has a number average molecular weight of 5,900 (polystyrene equivalent) as determined by GPC, with a molecular weight distribution of 1.35.

Then, to a toluene solution (100 mL) of the thus-obtained, hydroxyl-terminated poly(n-butyl acrylate) (68 g) and pyridine (14 mL) is added dropwise slowly undecenoyl chloride (7.1 mL, 33.0 mmol) in a nitrogen atmosphere at 75° C. The reaction is allowed to proceed at 60° C. The resulting white solid is filtered off. The organic layer is washed with dilute hydrochloric acid and brine, and dried over $Na_2SO_4$ and concentrated under reduced pressures to give an alkenyl-terminated poly(n-butyl acrylate) (64 g). To a toluene solution of the polymer is added aluminum silicate (Kyowa Chemical's Kyowaad 700PEL). The solution is stirred at the refluxing temperature to thereby remove the trace impurities in the polymer. The number of alkenyl groups introduced per oligomer molecule is 2.8 as determined by $^1H$ NMR analysis.

A 100-mL glass pressure reaction vessel is charged with the above polymer (25.3 g), dimethoxy-methylsilane (4.8 mL, 38.7 mmol), methyl orthoformate (1.4 mL, 12.9 mmol), and platinum catalyst. The amount of the platinum catalyst used is $10^{-4}$ equivalent by molar ratio relative to the alkenyl groups of the polymer. The reaction mixture is heated at 100° C. for 3 hours. The volatile matter of the mixture is distilled off under reduced pressures to give silyl-terminated poly(n-butyl acrylate). The number of silyl groups per oligomer molecule is 2.2 as determined by $^1H$ NMR analysis.

REFERENCE EXAMPLE 14

The crosslinking silyl-terminated poly(butyl acrylate) (2.5 g) as synthesized in Example 7, and curing catalyst (Nitto Kasei's U-220, 75 mg) are mixed up, cast into a mold, and defoamed at room temperature using a reduced pressure drier. After standing at room temperature for 7 days, a uniform rubber-like cured product is obtained. The gel fraction is 54%.

REFERENCE EXAMPLE 15

Into the silyl-terminated poly(butyl acrylate) as synthesized in Example 8 are added dibutyltin dimethoxide and water, followed by stirring thoroughly. The amount of tin catalyst and water used are one part by weight relative to the polymer, respectively.

The thus-obtained composition is cast into a mold, and defoamed under reduced pressures. After cured by heating at 50° C. for 20 hours, a uniform rubber-like cured sheet is obtained. This cured product is immersed in toluene for 24 hours and the gel fraction is determined from the weight change after and before immersion. The gel fraction is 88%.

Dumbbell (No. 2(1/3)) is punched out from the rubber-like cured sheet and subjected to tensile testing (measurement condition: 23° C., 200 mm/min) with Simazu's autograph. The breaking strength is 0.32 Mpa and the breaking elongation is 34%.

Terminal Alkenyl Series

EXAMPLE 9

A 30-mL glass pressure reaction vessel is charged with butyl acrylate (2.5 mL, 2.24 g, 17.45 mmol), α,α'-dibromo-p-xylene (92.5 mg, 0.35 mmol), cuprous bromide (50 mg, 0.35 mmol), 2,2'-bipyridyl (163 mg, 1.05 mmol), ethyl acetate (2 mL) and acetonitrile (0.5 mL). After dissolved oxygen elimination by blowing nitrogen gas for 10 minutes, the vessel is sealed, and the mixture is heated at 130° C. for an hour to allow the reaction to proceed. After cooling to room temperature, allyloxyethyl methacrylate obtained in Production Example 1 (600 mg, 3.5 mmol) is added in a nitrogen atmosphere, followed by sealing. The mixture is heated at 80° C. for an hour to allow the reaction to proceed. The reaction mixture is diluted with ethyl acetate (20 mL), the resulting insoluble matter is filtered off, and the filtrate is washed twice with dilute hydrochloric acid and once with brine. The organic layer is dried over $Na_2SO_4$ and the volatile matter is distilled off under reduced pressure to give 1.97 g (88% polymerization yield) of poly(butyl acrylate) having alkenyl groups at both ends, as represented by the formula shown below. The polymer has a number average molecular weight of 6,700 (polystyrene equivalent) as determined by GPC, with a molecular weight distribution of 1.60. The number of alkenyl groups introduced per oligomer molecule is 5.4 as determined by $^1H$ NMR analysis.

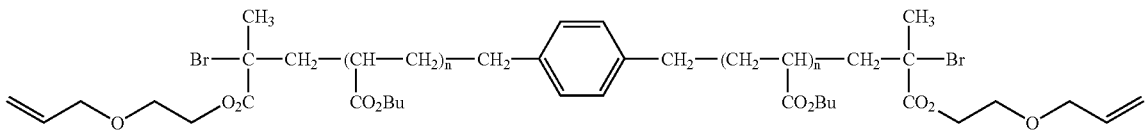

EXAMPLE 10

A 30-mL glass pressure reaction vessel is charged with butyl acrylate (5 mL, 4.47 g, 34.9 mmol), α,α'-dibromo-p-xylene (180 mg, 0.69 mmol), cuprous bromide (98 mg, 0.69 mmol), 2,2'-bipyridyl (319 mg, 2.06 mmol), ethyl acetate (4 mL) and acetonitrile (1 mL). After dissolved oxygen elimination by blowing nitrogen gas for 10 minutes, the vessel is sealed. The reaction mixture is heated at 130° C. for an hour to allow the reaction to proceed. After cooling the mixture, allyltributyltin (0.51 mL, 1.64 mmol) is added in a nitrogen atmosphere and the reaction is allowed to proceed at 100° C. for an hour. The reaction mixture is diluted with ethyl acetate (20 mL), the resulting insoluble matter is filtered off, and the filtrate is washed twice with dilute hydrochloric acid and once with brine. The organic layer is dried over $Na_2SO_4$, and the volatile matter is distilled off under reduced pressure to give a mixture of poly(butyl acrylate) having alkenyl groups at both ends, as represented by the formula shown below, and bromotributyltin (4.48 g yield). The polymer has a number average molecular weight of 6,300 (polystyrene equivalent) as determined by GPC, with a molecular weight distribution of 1.57. The number of alkenyl groups introduced per oligomer molecule is 2.2 as determined by $^1H$ NMR analysis.

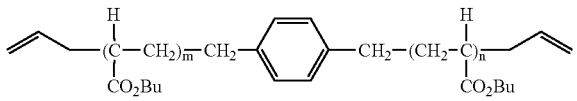

EXAMPLE 11

A 30-mL glass pressure reaction vessel is charged with butyl acrylate (2.5 mL, 2.24 g, 17.45 mmol), the alkenyl-containing initiator obtained in Production Example 5 (165 mg, 0.698 mmol), cuprous bromide (100 mg, 0.698 mmol), 2,2'-bipyridyl (218 mg, 1.40 mmol), acetonitrile (0.5 mL) and ethyl acetate (2 mL) and, after dissolved oxygen elimination by blowing nitrogen gas for 10 minutes, the vessel is sealed. The mixture is heated at 130° C. for 50 minutes to allow the reaction to proceed. After cooling to room temperature, the reaction mixture is diluted with ethyl acetate (20 mL), the resulting insoluble matter is filtered off, and the filtrate is washed twice with dilute hydrochloric acid and once with brine. The organic layer is dried over $Na_2SO_4$, and the volatile matter is distilled off under reduced pressure to give 1.90 g (79%) of poly(butyl acrylate) having an alkenyl group at one end and bromine at the other end. The polymer has a number average molecular weight of 3,600 (polystyrene equivalent) as determined by GPC, with a molecular weight distribution of 1.51. The number of alkenyl groups introduced per oligomer molecule is 0.75 as determined by $^1H$ NMR analysis.

Then, a 50-mL three-necked flask equipped with magnetic stirrer and reflux condenser is charged with the polymer obtained in the above manner (1.90 g), $Na_2S.9H_2O$ (70.2 mg, 0.293 mmol) and ethanol (3 mL), and the mixture is stirred at the refluxing temperature for 3 hours. After cooling to room temperature, ethyl acetate (10 mL) and dilute hydrochloric acid (10 mL) are added, and the mixture is allowed to separate into two layers. The organic layer is washed with dilute hydrochloric acid and brine and dried over $Na_2SO_4$, and the volatile matter is distilled off under reduced pressure to give 1.69 g of poly(butyl acrylate) having alkenyl groups at both ends, as represented by the formula shown below. The polymer has a number average molecular weight of 5,100 (polystyrene equivalent) as determined by GPC, with a molecular weight distribution of 1.73.

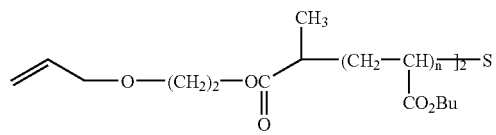

EXAMPLE 12

A one-liter pressure reaction vessel is charged with n-butyl acrylate (112 mL, 100 g, 0.78 mol), the hydroxyl-containing initiator obtained in Production Example 4 (3.07 g, 15.6 mmol), cuprous bromide (2.24 g, 15.6 mmol), 2,2'-bipyridyl (4.87 g, 31.2 mmol), ethyl acetate (90 mL) and acetonitrile (20 mL) and, after dissolved oxygen elimination by bubbling with nitrogen, the vessel is sealed. The mixture is heated at 130° C. for 2 hours to allow the reaction to proceed. After cooling the reaction vessel to room temperature, 2-hydroxyethyl methacrylate (3.92 mL, 4.06 g, 31.2 mmol) is added, and the reaction is allowed to proceed at 110° C. for 2 hours. The reaction mixture is dilute with ethyl acetate (200 mL), the insoluble matter is filtered off, and the filtrate is washed twice with 10% hydrochloric acid and once with brine. The organic layer is dried over $Na_2SO_4$, and the solvent is distilled off under reduced pressure to give 82 g of a hydroxyl-terminated poly(n-butyl acrylate). The polymer has a number average molecular weight of 5,100 (polystyrene equivalent) as determined by GPC, with a molecular weight distribution of 1.29.

Then, to a toluene solution (100 mL) of the thus-obtained hydroxyl-terminated poly(n-butyl acrylate) (50 g) and pyridine (10 mL) is added dropwise slowly undecenoyl chloride (7.22 mL, 6.81 g, 33.6 mmol) in a nitrogen atmosphere at 75° C. The resulting mixture is stirred at 75° C. for 3 hours. The resulting white solid is filtered off, and the organic layer is washed with dilute hydrochloric acid and brine. The organic layer is dried over $Na_2SO_4$ and concentrated under reduced pressure to give an alkenyl-terminated poly(n-butyl acrylate) (43 g) of the formula given below. The polymer has a number average molecular weight of 5,400 (polystyrene equivalent) as determined by GPC, with a molecular weight distribution of 1.30. The number of alkenyl groups introduced per oligomer molecule is 2.28 as determined by $^1H$ NMR analysis.

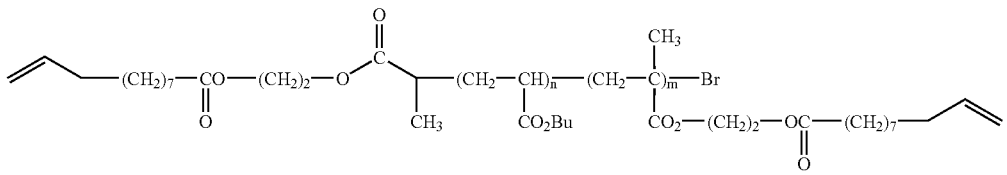

COMPARATIVE EXAMPLE 5

Poly (n-butyl acrylate) having hydroxyl groups at both ends is synthesized according to Production Example 3 of Japanese Kokai Publication Hei-06-211922. Thus, a 100-mL three-necked flask equipped with magnetic stirrer and dropping funnel is charged with 2-hdyroxyethyl disulfide (30.8 g, 24.4 mL, 0.2 mol). The flask is heated to 100° C., and the mixture of n-butyl acrylate (12.8 g, 14.32 mL, 0.1 mol) and AIBN (azobisisobutyronitrile) (0.328 g, 0.002 mol) is added dropwise over 30 minutes. The resulting mixture is further stirred at 100° C. for an hour. Toluene (20 mL) is then added, the mixture is allowed to stand in a separating funnel, and the lower layer is separated. The upper layer is washed three times with water and dried over $Na_2SO_4$, and the volatile matter is distilled off under reduced pressure to give poly (n-butyl acrylate) having hydroxyl groups at both ends (12.18 g, 95%). The polymer has a number average molecular weight of 4,300 (polystyrene equivalent) as determined by GPC, with a molecular weight distribution of 4.22.

Then, to a toluene solution (15 mL) containing the thus-obtained hydroxyl-terminated poly(n-butyl acrylate) (10.51 g) and pyridine (2 mL) is added dropwise slowly undecenoyl chloride (0.898 mL, 848 mg, 4.18 mmol) in a nitrogen atmosphere at 60C, and the resulting mixture is stirred at 60° C. for 3 hours. The resulting white solid is filtered off, and the organic layer is washed with dilute hydrochloric acid and brine. The organic layer is dried over $Na_2SO_4$ and concentrated under reduced pressure to give an alkenyl-terminated poly(n-butyl acrylate) of the formula shown below (7.45 g). The polymer has a number average molecular weight of 4,400 (polystyrene equivalent) as determined by GPC, with a molecular weight distribution of 4.31.

REFERENCE EXAMPLES 16–19 AND COMPARATIVE REFERENCE EXAMPLE 10

Production of Cured Products

The poly(butyl acrylate) having alkenyl groups at both ends as obtained in Examples 9–12 and Comparative Example 5 are each dissolved in toluene. Aluminum silicate (Kyowa Chemical's Kyowaad 700PEL) is added to this solution in an amount equal to the amount of the polymer, and the mixture is stirred for an hour to thereby remove the trace impurities in the polymer.

Then, each poly(butyl acrylate) thus purified is thoroughly mixed with a polyvalent hydrogensilicon compound of the formula shown below and platinum(0)-1,1,3,3-tetramethyl-1,3-divinyldisiloxane complex ($8.3 \times 10^{-8}$ mol/L xylene solution). The polyvalent hydrogensilicon compound is used in an amount such that the mole ratio of the alkenyl group of the polymer and the hydrosilyl group of the hydrogensilicon compound amounted to 1/1.2, and the platinum catalyst is used in a mole ratio of $10^{-4}$ to $10^{-3}$ equivalent relative to the alkenyl group of the polymer.

A portion of each composition thus obtained is subjected to curing testing on a hot plate at 130° C. and the gel time is measured. The remaining portion of the composition is degassed under reduced pressure and then poured into a mold and cured by heating to give a rubber-like cured product. The cured product is immersed in toluene for 24 hours. The weights before and after immersion are measured and the gel fraction is determined based on the change in weight. The results thus obtained are shown in Table 3.

TABLE 3

|  | Polymer | Pt cat. (mol %) | Gel time at 130° C. | Curing cond. | Gel fraction (%) |
|---|---|---|---|---|---|
| Ref. Ex. 16 | Ex. 9 | $10^{-3}$ | 3 min. | 100° C. 15 hrs | 51 |
| Ref. Ex. 17 | Ex. 10 | $10^{-3}$ | 25 min. | 100° C. 18 hrs | 40 |
| Ref. Ex. 18 | Ex. 11 | $10^{-3}$ | 4 min. | 100° C. 18 hrs | 77 |
| Ref. Ex. 19 | Ex. 12 | $10^{-4}$ | 8 sec. | 100° C. 14 hrs | 84 |
| Compar. Ref. 10 | Compar. Ex. 10 | $10^{-3}$ | No gelation | 130° C. 2 hrs | No gelation |

EXAMPLE 13

Example 9 is repeated except that methyl acrylate is used in lieu of n-butyl acrylate, to thereby an alkenyl-terminated poly(methyl acrylate) (93% yield). The polymer has a number average molecular weight of 7,900 (polystyrene equivalent) as determined by GPC, with a molecular weight distribution of 2.0. The number of alkenyl groups introduced per oligomer molecule is 3.3 on average upon $^1$H NMR analysis.

EXAMPLE 14

In a 500-mL three-necked flask equipped with a reflux condenser, n-butyl acrylate (300 mL) is polymerized at 70° C. in an nitrogen atmosphere using a catalyst cuprous bromide (1.50 g, 10.5 mmol), a ligand pentamethyldiethylenetriamine (1.65 mL), a initiator diethyl 2,5-dibromoadipate (9.42 g, 26.2 mmol), and a solvent acetonitrile (30 mL). When the polymerization rate of n-butyl acrylate is 93%, 1,7-octadiene (38.6 mL, 0.261 mol) is added. The mixture is heated at the same temperature, and then is diluted with ethyl acetate. The solution is passed through an activated alumina column for removing the catalyst. Its volatile matter is distilled off to give an alkenyl-terminated polymer. The polymer has a number average molecular weight of 13,800 (polystyrene equivalent) as determined by GPC, with a molecular weight distribution of 1.28. The number of alkenyl groups introduced per oligomer molecule is 1.84 upon $^1$H NMR analysis.

EXAMPLE 15

A 30-mL glass pressure reaction vessel is charged with n-butyl acrylate (7.5 mL, 6.72 g, 51.3 mmol), α,α'-dibromo-p-xylene (270 mg, 1.03 mmol), cuprous bromide (150 mg, 1.03 mmol), 2,2'-bipyridyl (323 mg, 2.06 mmol), ethyl acetate (6 mL) and acetonitrile (1.5 mL). After dissolved oxygen elimination by blowing nitrogen gas for 10 minutes, the reaction vessel is sealed. The mixture is heated at 130° C. for 1.5 hours to allow the reaction to proceed. The reaction mixture is diluted with ethyl acetate (20 mL), the resulting insoluble matter is filtered off, and the filtrate is washed twice with dilute hydrochloric acid and once with brine. The organic layer is dried over $Na_2SO_4$, and the volatile matter is distilled off under reduced pressures to give 5.0 g (75% polymerization yield) of a halogen-terminated poly(n-butyl acrylate). The polymer has a number average molecular weight of 5,600 (polystyrene equivalent) as determined by GPC, with a molecular weight distribution of 1.32.

In a nitrogen atmosphere, the above polymer (5.00 g), potassium undecylenate synthesized in Production Example 2 (476 mg, 2.14 mmol), and dimethylacetamide (10 mL) are allowed to react at 70° C. for 6 hours. The volatile matter of the mixture is distilled off under reduced pressures, and after adding ethyl acetate, the insoluble matter is filtered off. The volatile matter of the filtrate is distilled off under reduced pressures to give 4.77 g of an alkenyl-terminated poly(n-butyl acrylate). The number of alkenyl groups introduced per oligomer molecule is 1.70 upon $^1$H NMR analysis.

EXAMPLE 16

In the same manner as in Example 15, n-butyl acrylate (300 mL) is polymerized at 70° C. in an nitrogen atmosphere using a catalyst cuprous bromide (1.50 g, 10.5 mmol), a ligand pentamethyldiethylenetriamine (0.69 mL), a initiator diethyl 2,5-dibromoadipate (9.42 g, 26.2 mmol), and a solvent acetonitrile (30 mL), to thereby give an halogen-terminated poly(n-butyl acrylate). The polymer has a number average molecular weight of 11,300 (polystyrene equivalent) as determined by GPC, with a molecular weight distribution of 1.16.

Next, Example 15 is repeated except that potassium pentenoate prepared in Production Example 3 is used as carboxylic salt, to thereby an alkenyl-terminated poly(n-butyl acrylate). The number of alkenyl groups introduced per oligomer molecule is 1.84 upon $^1$H NMR analysis.

EXAMPLE 17

A 30-mL glass pressure reaction vessel is charged with n-butyl acrylate (5 mL, 4.47 g, 34.9 mmol), α,α'-dibromo-p-xylene (180 mg, 0.69 mmol), cuprous bromide (98 mg, 0.69 mmol), 2,2'-bipyridyl (319 mg, 2.06 mmol), ethyl acetate (4 mL) and acetonitrile (one mL). After dissolved oxygen elimination by blowing nitrogen gas for 10 minutes, the reaction vessel is sealed. The mixture is heated at 130° C. for one hour to allow the reaction to proceed. After cooling the mixture, allyltributyltin (0.51 mL, 1.64 mmol) is added in a nitrogen atmosphere and the reaction is allowed to proceed at 100° C for one hour. The reaction mixture is diluted with ethyl acetate (20 mL), the resulting insoluble matter is filtered off, and the filtrate is washed twice with dilute hydrochloric acid and once with brine. The organic layer is dried over $Na_2SO_4$, and the volatile matter is distilled off under reduced pressures to give a mixture of an alkenyl-terminated poly(n-butyl acrylate) and bromotributyltin (4.48 g yield). The polymer has a number average molecular weight of 6,300 (polystyrene equivalent) as determined by GPC, with a molecular weight distribution of 1.57. The number of alkenyl groups introduced per oligomer molecule is found to be 2.2 upon $^1$H NMR analysis.

EXAMPLE 18

A 30-mL glass pressure reaction vessel is charged with methyl acrylate (5 mL, 4.78 g, 55.5 mmol), allyl 2-methyl-2-bromopropionate (0.354 mL, 460 mg, 2.22 mmol), cuprous bromide (318 mg, 2.22 mmol), 2,2'-bipyridyl (1.04 g, 6.66 mmol), acetonitrile (one mL), and ethyl acetate (4 mL). After dissolved oxygen elimination by carrying out vacuum degassing three times, the reaction vessel is sealed. The mixture is heated at 80° C for 3 hours to allow the reaction to proceed. After cooling the mixture to the room temperature, the reaction mixture is diluted with ethyl acetate (20 mL), the resulting insoluble matter is filtered off, and the filtrate is washed twice with dilute hydrochloric acid and once with brine. The organic layer is dried over $Na_2SO_4$, and the volatile matter is distilled off under reduced pressures to give 3.93 g (75%) of a poly(methyl acrylate) having an alkenyl group at one end and bromine at the other end. The polymer has a number average molecular weight of 2,700 (polystyrene equivalent) as determined by GPC, with a molecular weight distribution of 1.48. The number of alkenyl groups introduced per oligomer molecule is 0.81 upon $^1$H NMR analysis.

Then, a 50-mL three-necked flask equipped with magnetic stirrer and reflux condenser is charged with the polymer obtained in the above manner (1.17 g), $Na_2S.9H_2O$ (57.6 mg, 0.240 mmol) and ethanol (2 mL), and the mixture is stirred at the refluxing temperature for 3 hours. After cooling to room temperature, ethyl acetate (10 mL) and dilute hydrochloric acid (10 mL) are added, and the mixture is allowed to separate into two layers. The organic layer is washed with dilute hydrochloric acid and brine and dried over Na$_2$SO$_4$, and the volatile matter is distilled off under reduced pressures to give 1.11 g of an alkenyl-terminated poly(methyl acrylate). The polymer has a number average molecular weight of 4,200 (polystyrene equivalent) as determined by GPC, with a molecular weight distribution of 1.71.

EXAMPLE 19

A one-liter pressure reaction vessel is charged with n-butyl acrylate (112 mL, 100 g, 0.78 mol), the hydroxyl-containing initiator obtained in Production Example 4 (3.07 g, 15.6 mmol), cuprous bromide (2.24 g, 15.6 mmol), 2,2'-bipyridyl (4.87 g, 31.2 mmol), ethyl acetate (90 mL) and acetonitrile (22 mL) and, after dissolved oxygen elimination by bubbling with nitrogen, the vessel is sealed. The mixture is heated at 130° C. for 2 hours to allow the reaction to proceed. After cooling the reaction vessel to room temperature, 2-hydroxyethyl methacrylate (3.92 mL, 4.06 g, 31.2 mmol) is added, and the reaction is allowed to proceed at 110° C. for 2 hours. The reaction mixture is diluted with ethyl acetate (200 mL), the insoluble matter is filtered off, and the filtrate is washed twice with 10% hydrochloric acid and once with brine. The organic layer is dried over Na$_2$SO$_4$, and the solvent is distilled off under reduced pressure to give 82 g of a hydroxyl-terminated poly(n-butyl acrylate). The polymer has a number average molecular weight of 5,100 (polystyrene equivalent) as determined by GPC, with a molecular weight distribution of 1.29.

Then, to a toluene solution (100 mL) of the thus-obtained hydroxyl-terminated poly(n-butyl acrylate) (50 g) and pyridine (10 mL) is added dropwise slowly undecenoyl chloride (7.22 mL, 6.81 g, 33.6 mmol) in a nitrogen atmosphere at 75° C. The resulting mixture is stirred at 75° C. for 3 hours. The resulting white solid is filtered off, and the organic layer is washed with dilute hydrochloric acid and brine. The organic layer is dried over Na$_2$SO$_4$ and concentrated under reduced pressure to give an alkenyl-terminated poly(n-butyl acrylate) (43 g).

REFERENCE EXAMPLES 20–29

Production of Cured Products

The alkenyl-terminated polymers obtained in Examples 13–19 are each treated with aluminum silicate (Kyowa Chemical's Kyowaad 700PEL) to thereby remove the trace impurities in the polymer.

Then, each poly(ester acrylate) thus purified is thoroughly mixed with a polyvalent hydrogensilicon compound and platinum(0)-1,1,3,3-tetramethyl-1,3-divinyldisiloxane complex (8.3×10$^{-8}$ mol/L xylene solution). Here, as the polyvalent hydrogensilicon compound used is the compound (S-1) or (S-2) of the formula shown below or methylhydrogensiloxane (S-3: SiH value, 7.69 mmol/g) partly modified with α-methylstyrene. The polyvalent hydrogensilicon compound is used in an amount such that the mole ratio of the alkenyl group of the polymer and the hydrosilyl group of the hydrogensilicon compound amounted to 1/1.2–1/1.5, and the platinum catalyst is used in a required amount relative to the alkenyl group of the polymer.

A portion of each composition thus obtained is subjected to curing testing on a hot plate at 130° C. and the gel time is measured. The remaining portion of the composition is degassed under reduced pressure and then poured into a mold and cured by heating at 100° C. to give a rubber-like cured product. The cured product is immersed in toluene for 24 hours. The weights before and after immersion are measured and the gel fraction is determined based on the change in weight. The results thus obtained are shown in Table 4.

TABLE 4

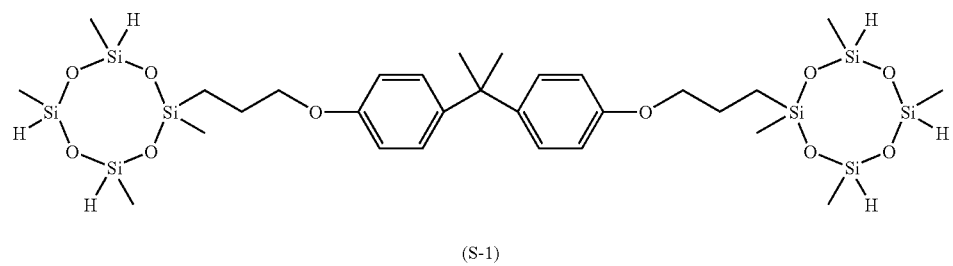

(S-1)

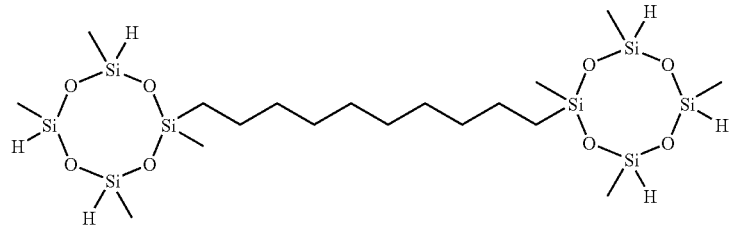

(S-2)

| Ref. Ex. | Polymer | Hydrogen silicon | Pt cat. (mol %) | Gel time at 130° C. | Gel fraction (%) |
|---|---|---|---|---|---|
| Ref. Ex. 20 | Ex. 13 | S-1 | 10$^{-3}$ | 45 sec. | 55 |
| Ref. Ex. 21 | Ex. 14 | S-1 | 7 × 10$^{-3}$ | 15 sec. | No data |

TABLE 4-continued

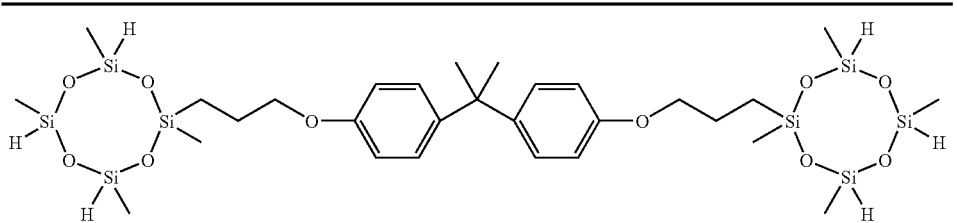

(S-1)

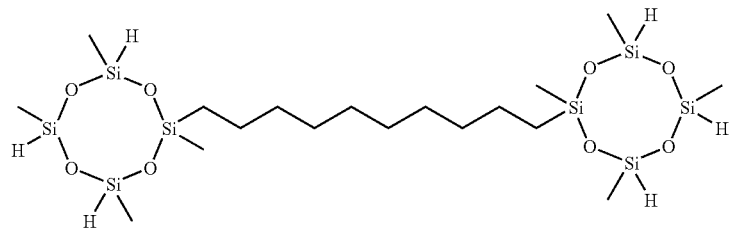

(S-2)

| Ref. Ex. | Polymer | Hydrogen silicon | Pt cat. (mol %) | Gel time at 130° C. | Gel fraction (%) |
|---|---|---|---|---|---|
| Ref. Ex. 22 | Ex. 14 | S-2 | $7 \times 10^{-3}$ | 21 sec. | No data |
| Ref. Ex. 23 | Ex. 14 | S-3 | $7 \times 10^{-3}$ | 26 sec. | No data |
| Ref. Ex. 24 | Ex. 15 | S-1 | $10^{-4}$ | 60 sec. | 85 |
| Ref. Ex. 25 | Ex. 16 | S-1 | $10^{-4}$ | 92 sec. | 70 |
| Ref. Ex. 26 | Ex. 16 | S-3 | $10^{-4}$ | 26 sec. | 90 |
| Ref. Ex. 27 | Ex. 17 | S-1 | $10^{-4}$ | 25 sec. | 40 |
| Ref. Ex. 28 | Ex. 18 | S-1 | $10^{-4}$ | 120 sec. | 40 |
| Ref. Ex. 29 | Ex. 19 | S-1 | $10^{-4}$ | 8 sec. | 84 |

Terminal Hydroxyl Series

EXAMPLE 20

A 30-mL pressure reaction vessel is charged with n-butyl acrylate (5 mL, 4.47 g, 34.9 mmol), the hydroxyl-containing initiator obtained in Production Example 4 (138 mg, 0.698 mmol), cuprous bromide (100 mg, 0.698 mmol), 2,2'-bipyridyl (218 mg, 1.40 mmol), ethyl acetate (4 mL) and acetonitrile (one mL), and after dissolved oxygen elimination by bubbling with nitrogen, the vessel is sealed. The mixture is heated at 130° C. for 2 hours to allow the reaction to proceed. The reaction vessel is then cooled to room temperature, 2-hydroxyethyl methacrylate (0.176 mL, 182 mg, 1.40 mmol) is added, and the reaction is allowed to proceed at 100° C. for 2 hours. The reaction mixture is diluted with ethyl acetate (20 mL), the insoluble matter is filtered off, and the filtrate is washed twice with 10% hydrochloric acid and once with brine. The organic layer is dried over $Na_2SO_4$, and the solvent is distilled off under reduced pressure to give 4.44 g (93% yield) of an hydroxyl-terminated poly(n-butyl acrylate) having the formula shown below. The polymer has a number average molecular weight of 6,100 (polystyrene equivalent) as determined by GPC, with a molecular weight distribution of 1.32. The number of hydroxyl groups per polymer molecule is on average 3.3 as determined by NMR measurement. The viscosity of this polymer as determined by using an E type viscometer (shear rate: 10 sec$^{-1}$, 23° C.) is 388 poises.

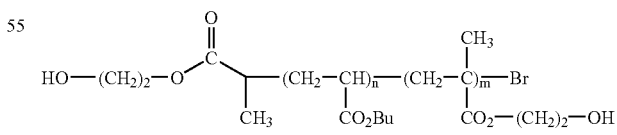

COMPARATIVE EXAMPLE 6

Poly(n-butyl acrylate) having hydroxyl groups at both ends is synthesized according to Example 1 of Japanese Kokai Publication Hei-05-262808. Thus, a 100-mL three-necked flask equipped with magnetic stirrer and dropping funnel is charged with 2-hydroxyethyl disulfide (30.8 g, 24.4 mL, 0.2 mol). The flask is heated to 100° C., and a mixture of n-butyl acrylate (12.8 g, 14.32 mL, 0.1 mol) and AIBN (0.328 g, 0.002 mol) is added dropwise over 30 minutes. The mixture is further stirred at 100° C. for an hour. Toluene (20 mL) is then added, the mixture is allowed to stand in a separating funnel, and the lower layer is separated. The upper layer is washed three times with water and dried over $Na_2SO_4$, and the volatile matter is distilled off under reduced pressure to give a poly(n-butyl acrylate) having hydroxyl groups at both ends (12.18 g, 95%). The polymer has a number average molecular weight of 4,300 (polystyrene equivalent) as determined by GPC, with a molecular weight distribution of 4.22. The viscosity of this polymer as determined by using an E type viscometer (shear rate: 10 $sec^{-1}$, 23° C.) is 490 poises. The average number of hydroxyl group per polymer molecule is 1.42 as determined by $^1H$ NMR analysis.

Such properties of the polymers obtained in Example and Comparative Example 6 are summarized in Table 5.

TABLE 5

| Polymer | Mol. Weight (Mn) | Mol. weight distribution (Mw/Mn) | Viscosity (poises) |
|---|---|---|---|
| Example 20 | 6,100 | 1.32 | 388 |
| Compar. Example 6 | 4,300 | 4.22 | 490 |

The polymer of Example 20 has lower viscosity despite of considerately higher number average molecular weight as compared to that of Comparative Example 6. This clarifies the superiority of the polymer of the present invention, which has narrow molecular weight distribution.

REFERENCE EXAMPLE 30 AND COMPARATIVE EXAMPLE 11

Production of Urethane Cured Products

The poly(n-butyl acrylate) having hydroxyl groups at both ends as obtained in Example 20 and Comparative Example 6 are each thoroughly mixed with a trifunctional isocyanate compound (Ipposha Yushi's B-45) having the formula shown below and a tin catalyst (Nitto Kasei's U-220, dibutyltin diacetylacetonate). The mixing ratio is such that the mole ratio between the hydroxyl group of the (meth) acrylic polymer and the isocyanate of the isocyanate compound amounted to 1/1. The tin catalyst is used in an amount of 0.1 part by weight per 100 parts by weight of the polymer.

Each mixture prepared in the above manner is degassed under reduced pressure, then poured into a mold, and cured by heating at 80° C. for 15 hours. A portion of the sheet-form cured product obtained is immersed in toluene for 24 hours. The weights before and after immersion are measured and the gel fraction is determined based on the change in weight. Dumbbells (No. 3) according to JIS K 6301 are punched out from the sheet-form cured product and subjected to tensile testing at a rate of pulling of 200 mm/min. The results thus obtained are shown in Table 6.

TABLE 6

| Polymer | | Breaking strength (kgf/cm²) | Elongation (%) | Gel fraction (%) |
|---|---|---|---|---|
| Ref. Ex. 30 | Ex. 20 | 25.3 | 157 | 91 |
| Compar. Ref. Ex. 11 | Compar. Ex. 6 | 19.1 | 127 | 82 |

Reference Example 30 is more excellent than Comparative Reference Example 11 in breaking strength, elongation, and gel fraction. This clarifies the improvement in the polymer of the invention.

EXAMPLE 21

Synthesis of hydroxyl-terminated poly(n-butyl acrylate)

A one-liter pressure reaction vessel is charged with n-butyl acrylate (112 mL, 100 g, 0.78 mol), the hydroxyl-containing initiator obtained in Production Example 4 (3.07 g, 15.6 mmol), cuprous bromide (2.24 g, 15.6 mmol), 2,2'-bipyridyl (4.87 g, 31.2 mmol), ethyl acetate (90 mL) and acetonitrile (20 mL). After dissolved oxygen elimination by bubbling with nitrogen, the reaction vessel is sealed. The mixture is heated at 130° C. for 2 hours to allow the reaction to proceed. The reaction vessel is cooled to room temperature, 2-hydroxyethyl methacrylate (3.92 mL, 4.06 g, 31.2 mmol) is added, and the reaction is allowed to proceed at 110° C. for 2 hours. The reaction mixture is diluted with ethyl acetate (200 mL), the insoluble matter is filtered off, and the filtrate is washed with 10% hydrochloric acid and with brine. The organic layer is dried over $Na_2SO_4$, and the solvent is distilled off under reduced pressure to give 82 g of a hydroxyl-terminated poly(n-butyl acrylate). The viscosity of this polymer is 25 Pa.s. The polymer has a number average molecular weight of 5,100 (mobile phase: chloroform, polystyrene equivalent) as determined by GPC, with a molecular weight distribution of 1.29. Its $^1H$ NMR analysis showed that the polymer contained, on an average, 2.39 hydroxyl groups per molecule.

Synthesis of crosslinking silyl-terminated poly(n-butyl acrylate)

The hydroxyl-terminated poly(n-butyl acrylate) obtained above (4.94 g, OH=2.30 mmol) is dehydrated by azeotropy at 50° C. in the presence of toluene. To this are added tin octynate (4.9 mg) and toluene (6 mL), and then methyldimethoxysilylpropyl isocyanate (0.524 g, 2.77 mmol) is added dropwise at 50° C. After completion of addition, the reaction temperature is raised to 70° C., with continuing reaction for 4 hours. It is concluded that there are no hydroxyl groups unreacted because the signal (3.8 ppm) of methylene group bound to hydroxyl group is disappeared in $^1$H NMR. The volatile matter is distilled off under reduced pressures to give a crosslinking silyl-terminated poly(n-butyl acrylate). The viscosity of this polymer is 22 Pa.s. The polymer has a number average molecular weight of 4,900 (mobile phase: chloroform, polystyrene equivalent) as determined by GPC, with a molecular weight distribution of 1.60.

REFERENCE EXAMPLE 31

One hundred parts by weight of the crosslinking silyl-terminated polymer as obtained in Example 21 is mixed with one part by weight of dibutyltin diacethylacetonate, cast into a mold, and defoamed at room temperature using a reduced pressure drier. After cured by heating at 50° C. for 20 hours, a uniform rubber-like cured sheet is obtained. The gel fraction is 93% as obtained by toluene extraction.

Dumbbell (No. 2(1/3)) is punched out from the rubber-like cured sheet and subjected to tensile testing (200 mm/min) with autograph. The breaking strength is 0.31 Mpa and the breaking elongation is 35%.

COMPARATIVE EXAMPLE 7

Synthesis of crosslinking silyl-terminated poly(n-butyl acrylate) using hydroxyl-containing disulfide The hydroxyl-terminated poly(n-butyl acrylate) obtained in Comparative Example 6 (4.52 g, OH=1.85 mmol) is dehydrated by azeotropy at 50° C. in the presence of toluene. To this are added tin octynate (4.52 mg) and toluene (6 mL), and then methyldimethoxysilylpropyl isocyanate (0.421 g, 2.22 mmol) is added dropwise at 50° C. After completion of adding, the reaction temperature is raised to 70° C., with continuing reaction for 4 hours. It is concluded that there are no hydroxyl groups unreacted because the signal (3.8 ppm) of methylene group bound to hydroxyl group is disappeared in $^1$H NMR. The volatile matter is distilled off under reduced pressures to give a crosslinking silyl-terminated poly(n-butyl acrylate). The viscosity of this polymer is 53 Pa.s. The polymer has a number average molecular weight of 4,700 (mobile phase: chloroform, polystyrene equivalent) as determined by GPC, with a molecular weight distribution of 3.71.

COMPARATIVE REFERENCE EXAMPLE 12

One hundred parts by weight of the crosslinking silyl-terminated polymer as obtained in Comparative Example 7 is mixed with one part by weight of dibutyltin diacethylacetonate, cast into a mold, and defoamed at room temperature using a reduced pressure drier. After cured by heating at 50° C. for 20 hours, a uniform rubber-like cured sheet is obtained. The gel fraction is 82% as obtained by toluene extraction. The extract is concentrated to measure $^1$H NMR, but there are no crosslinking silyl groups.

Dumbbell (No. 2(1/3)) is punched out from the rubber-like cured sheet and subjected to tensile testing (200 mm/min) with autograph. The breaking strength is 0.21 Mpa and the breaking elongation is 93%.

EXAMPLE 22

A 30-mL pressure reaction vessel is charged with n-butyl acrylate (5 mL, 4.47 g, 34.9 mmol), α,α'-dibromo-p-xylene (185 mg, 0.70 mmol), cuprous bromide (100 mg, 0.70 mmol), 2,2'-bipyridyl (326 mg, 2.10 mmol), ethyl acetate (4mL) and acetonitrile (one mL) and, after dissolved oxygen elimination by bubbling with nitrogen for 10 minutes, the vessel is sealed. The mixture is heated at 130° C. for 3 hours to allow the reaction to proceed. After cooling the reaction vessel to room temperature, 2-hydroxyethyl methacrylate (0.352 mL, 364 mg, 2.80 mmol) is added and, after sealing, the reaction is allowed to proceed at 80° C. for 2 hours. The reaction mixture is diluted with ethyl acetate (20 mL), and the filtrate is washed with three portions of 10% hydrochloric acid and with one portion of brine. The organic layer is dried over $Na_2SO_4$, and the solvent is distilled off under reduced pressure to give 4.11 g (82%) of a hydroxyl-terminated poly(n-butyl acrylate) having the formula shown below. The polymer has a number average molecular weight of 5,900 (polystyrene equivalent) as determined by GPC, with a molecular weight distribution of 1.45. Its $^1$H NMR analysis showed that the polymer contained, on an average, 3.2 hydroxyl groups per molecule.

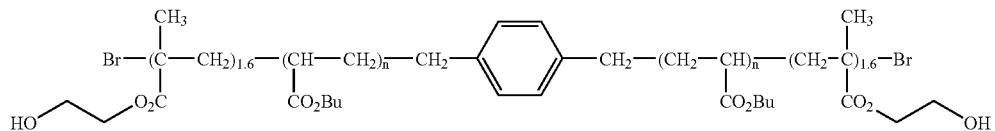

EXAMPLE 23

A modification of poly(n-butyl acrylate) (6.96 g, 75% yield) is obtained in the same manner as in Example 20 except that n-butyl acrylate is used in an amount of 10 mL. The number average molecular weight of the polymer as determined by GPC (polystyrene basis) is 8,300 with molecular weight distribution of 1.32. According to NMR spectrometry, the polymer contained, on an average, 2.2 hydroxyl groups per molecule.

EXAMPLE 24

A modification of poly(n-butyl acrylate) (5.75 g, 82% yield) is obtained in the same manner as in Example 20 except that n-butyl acrylate is used in an amount of 7.5 mL. The number average molecular weight of the polymer as determined by GPC (polystyrene basis) is 7,500 with molecular weight distribution of 1.36. According to NMR spectrometry, the polymer contained, on an average, 2.1 hydroxyl groups per molecule.

EXAMPLE 25

A 50-mL pressure reaction vessel is charged with n-butyl acrylate (10.94 mL, 9.78 g, 76.3 mmol), the hydroxyl-containing initiator obtained in Production Example 4 (301 mg, 1.53 mmol), cuprous bromide (219 mg, 1.53 mmol), 2,2'-bipyridyl (476 mg, 3.05 mmol), ethyl acetate (8.8 mL)

and acetonitrile (2.2 mL) and, after dissolved oxygen elimination by bubbling with nitrogen, the vessel is sealed. The mixture is heated at 130° C. for 1.3 hours to allow the reaction to proceed. The reaction mixture is diluted with ethyl acetate (20 mL), and the filtrate is washed three times with 10% hydrochloric acid and once with brine. The organic layer is dried over $Na_2SO_4$, and the solvent is distilled off under reduced pressure to give 5.23 g (53%) of a poly(n-butyl acrylate) having a hydroxyl group at one end. The polymer has a number average molecular weight of 3,400 (polystyrene equivalent) as determined by GPC, with a molecular weight distribution of 1.31. Its $^1H$ NMR analysis showed that the polymer contained, on an average, 1.09 hydroxyl groups per molecule.

Then, a 50-mL three-necked flask equipped with magnetic stirrer and reflux condenser is charged with the poly(n-butyl acrylate) having a hydroxyl group at one end obtained in the above manner (2.15 g), $Na_2S.9H_2O$ (76.3 mg, 0.318 mmol) and ethanol (3 mL), and the mixture is stirred at the refluxing temperature for 3 hours. After cooling to room temperature, ethyl acetate (5 mL) and 10% hydrochloric acid (5 mL) are added, and the mixture is allowed to separate into two layers. The organic layer is washed with 10% hydrochloric acid and brine and dried over $Na_2SO_4$, and the volatile matter is distilled off under reduced pressure to give 1.93 g of a poly(n-butyl acrylate) having hydroxyl groups at both ends, as represented by the formula shown below. The polymer has a number average molecular weight of 5,700 (polystyrene equivalent) as determined by GPC, with a molecular weight distribution of 1.39.

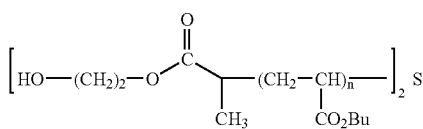

REFERENCE EXAMPLE 32–35

Production of Cured Products

The poly(n-butyl acrylate) having hydroxyl groups at both ends as obtained in Examples 22–25 are each thoroughly mixed with a trifunctional isocyanate compound (Ipposha Yushi's B-45) having the formula shown below and a tin catalyst (Nitto Kasei's U-220, dibutyltin diacetyl-acetonate). The mixing ratio is such that the mole ratio between the hydroxyl group of the (meth)acrylic polymer and the isocyanate of the isocyanate compound amounted to 1/1. The tin catalyst is used in an amount of 0.1 part by weight per 100 parts by weight of the polymer.

Each mixture is degassed under reduced pressure, then poured into a mold, and cured by heating at 80° C. for 15 hours. A portion of the cured product obtained is immersed in toluene for 24 hours. The weights before and after immersion are measured and the gel fraction is determined based on the change in weight. The results thus obtained are shown in Table 7.

TABLE 7

| Ref. Ex. | 32 | 33 | 34 | 35 |
|---|---|---|---|---|
| Polymer | Ex. 22 | Ex. 23 | Ex. 24 | Ex. 25 |
| Gel fraction (%) | 71 | 62 | 77 | 89 |

EXAMPLE 26

A 100-mL reactor is charged with n-butyl acrylate (20 mL, 1.79 g, 0.140 mmol), diethyl 2,5-dibromoadipate (0.628 g, 1.74 mmol), cuprous bromide (225 mg, 1.57 mmol), pentamethyldiehtylenetriamine (0.328 mL, 0.272 g, 1.57 mmol), and toluene (2.0 mL). After carrying out freeze degassing, the reactor is purged with nitrogen. The mixture is heated at 70° C. to allow the reaction to proceed for 45 minutes. At this time, the conversion rate of the monomer is 82%. The reaction mixture is diluted with ethyl acetate, and then the solution is passed through an activated alumina column for removing copper catalyst to obtain a bromine-terminated poly(n-butyl acrylate). The polymer obtained has a number average molecular weight of 10,200 and a molecular weight distribution of 1.44.

In N,N-dimethylacetamide (10 mL) are mixed the poly (n-butyl acrylate) obtained (5.00 g) and sodium 4-hydroxybutanoate, and the solution is stirred at 70° C. for 3 hours. The reaction solution is diluted with ethyl acetate and washed with water. The volatile matter of the organic layer is distilled off under reduced pressures to obtain the polymer having hydroxyl groups at both ends. Its $^1H$ NMR analysis showed that the polymer contained, on an average, 1.66 hydroxyl groups per molecule.

REFERENCE EXAMPLE 36

The poly(n-butyl acrylate) having hydroxyl groups at both ends as obtained in Example 26 is thoroughly mixed with a trifunctional isocyanate compound (Ipposha Yushi's B-45). The mixing ratio is such that the mole ratio between the hydroxyl group of the polymer and the isocyanate of the isocyanate compound amounted to 1/3. This mixture is degassed under reduced pressure, and cured by heating at 100° C. for 24 hours. A portion of the cured product obtained is immersed in toluene for 24 hours. The gel fraction is 97% as determined based on the change in weight before and after immersion.

The invention claimed is:
1. A vinyl polymer which has at least one terminal functional group per molecule and has a ratio of weight average molecular weight to number average molecular weight of less than 1.8 as determined by gel permeation chromatography and has a number average molecular weight 500–100,000, said terminal functional group being a crosslinking silyl group of the general formula (1) shown below,

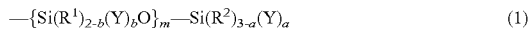

$$—\{Si(R^1)_{2-b}(Y)_bO\}_m—Si(R^2)_{3-a}(Y)_a \qquad (1)$$

wherein $R^1$ and $R^2$ each independently represents an alkyl group containing 1 to 20 carbon atoms, an aryl group containing 6 to 20 carbon atoms, an aralkyl group containing 7 to 20 carbon atoms, or a triorganosiloxy group of the formula $(R')_3SiO—$, R' being a monovalent hydrocarbon residue containing 1 to 20 carbon atoms and the three R' groups being the same or different, provided that when a plurality of $R^1$ or $R^2$ groups occur, they may be the same or different; Y represents a hydroxyl group or a hydrolyzable group, provided that when a plurality of Y groups occur, they may be the same or different; a represents 0, 1, 2 or 3, b represents 0, 1 or 2, and m represents an integer of 0 to 19, provided that the condition a+mb≧1 should be satisfied, wherein the vinyl polymer having at least one terminal crosslinking silyl group is prepared by adding a hydrosilane compound having a crosslinking silyl group to a vinyl polymer having at least one alkenyl group which is prepared by adding a compound having at least two poorly polymerizable alkenyl groups to a reaction mixture when synthesizing a vinyl polymer by living radical polymerization, wherein the compound having at least two poorly polymerizable alkenyl groups is 1,5-hexadiene, 1,7-octadiene or 1,9-decadiene.

2. The vinyl polymer according to claim 1, wherein the ratio of weight average molecular weight to number average molecular weight as determined by gel permeation chromatography is not more than 1.7.

3. The vinyl polymer according to claim 1, wherein the ratio of weight average molecular weight to number average molecular weight as determined by gel permeation chromatography is not more than 1.6.

4. The vinyl polymer according to claim 1 wherein the ratio of weight average molecular weight to number average molecular weight as determined by gel permeation chromatography is not more than 1.5.

5. The polymer according to claim 1, wherein its main chain is a (meth)acrylic polymer.

6. The polymer according to claim 5, wherein the main chain is an acrylate ester polymer.

7. The vinyl polymer according to claim 1, wherein the main chain is produced by atom transfer radical polymerization.

8. The crosslinking silyl-terminated vinyl polymer according to claim 1, wherein Y in general formula (1) is a hydrogen atom, a halogen atom, a hydroxyl, alkoxyl, acyloxy, ketoximate, amino, amido, aminoxyl, mercapto or alkenyloxyl group, provided that when a plurality of Y groups occur, they may be the same or different with each other.

9. The vinyl polymer according to claim 8, wherein Y in general formula (1) is an alkoxyl group.

10. The vinyl polymer according to claim 1, wherein the compound having at least two poorly polymerizable alkenyl groups is added to a reaction mixture at the final stage of polymerization or after completion of polymerizing a given first monomer when synthesizing a vinyl polymer by living radical polymerization.

* * * * *